US010065280B2

(12) United States Patent
Sarh et al.

(10) Patent No.: US 10,065,280 B2
(45) Date of Patent: Sep. 4, 2018

(54) MULTIFUNCTION LEGS FOR AUTONOMOUS CRAWLING ASSEMBLY EQUIPMENT

(71) Applicant: The Boeing Company, Chicago, IL (US)

(72) Inventors: Branko Sarh, Huntington Beach, CA (US); James Darryl Gamboa, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 730 days.

(21) Appl. No.: 13/957,000

(22) Filed: Aug. 1, 2013

(65) Prior Publication Data
US 2014/0115860 A1 May 1, 2014

Related U.S. Application Data

(63) Continuation-in-part of application No. 13/663,805, filed on Oct. 30, 2012, now Pat. No. 9,327,376, which
(Continued)

(51) Int. Cl.
*B62D 57/024* (2006.01)
*B23P 19/04* (2006.01)
*B23P 19/06* (2006.01)

(52) U.S. Cl.
CPC .............. *B23P 19/04* (2013.01); *B23P 19/06* (2013.01); *B62D 57/024* (2013.01); *Y10T 29/49826* (2015.01); *Y10T 29/53983* (2015.01)

(58) Field of Classification Search
CPC ..... B25B 11/005; B25B 5/065; B23B 31/305; B23B 31/307; B23B 31/32; B23P 19/04;
(Continued)

(56) References Cited

U.S. PATENT DOCUMENTS 3,167,145 A   1/1965   Mackie
3,246,711 A   4/1966   Snoeyenbos
(Continued)

FOREIGN PATENT DOCUMENTS

CA     2030491     10/1995
CN     201079850   7/2008
(Continued)

OTHER PUBLICATIONS

Extended European Search Report, Patent Application No. 14178423.1 dated Jan. 22, 2015.
(Continued)

*Primary Examiner* — Christopher M Koehler
*Assistant Examiner* — Joel Crandall
(74) *Attorney, Agent, or Firm* — Kunzler, PC

(57) ABSTRACT

An automated motorized device may be configured to move on a structure for use in assembling operations thereon. The automated motorized device may comprise a plurality of multifunction movement components, which may be attached to one or more movement assemblies. Functions of each multifunction movement component may comprise adhering and moving. The adhering function may be performed using sealing element, which may be used to create seal between corresponding multifunction movement component and structure. The moving function may be performed using a rolling element, which may be configured to allow rolling on the structure. In some instances, one or more of the multifunction movement components may be configured to also provide floating function, which may be performed, e.g., mechanically or pneumatically. In some instances, three non-floating multifunction movement components may be configured to form a triangle, to enable maintaining contact with the structure, including when traversing compound surfaces.

26 Claims, 10 Drawing Sheets

Related U.S. Application Data is a continuation-in-part of application No. 13/663,838, filed on Oct. 30, 2012, now Pat. No. 9,475,527.

(58) Field of Classification Search
CPC ....... B23P 19/06; B62D 57/024; B62D 57/00; B62D 57/02; B62D 57/022; B62D 57/028; B62D 57/032; B64F 5/0009; B64F 5/0018; Y10T 29/49826; Y10T 29/53983; B24C 3/06; B24C 3/062; A47L 1/02; A47L 1/03
USPC ......... 269/21, 22; 29/281.1, 281.6; 248/363; 180/164
See application file for complete search history.

(56) References Cited

U.S. PATENT DOCUMENTS

| | | | |
|---|---|---|---|
| 4,470,585 A | 9/1984 | Bavelloni | |
| 4,664,212 A | 5/1987 | Nagatsuka et al. | |
| 4,926,957 A | 5/1990 | Urakami | |
| 4,997,052 A | 3/1991 | Urakami | |
| 5,161,631 A * | 11/1992 | Urakami | B24C 3/06 180/164 |
| 5,468,099 A | 11/1995 | Wheetley et al. | |
| 5,633,707 A | 5/1997 | Seemann | |
| 5,657,972 A | 8/1997 | Blatt | |
| 5,890,553 A | 4/1999 | Bar-Cohen et al. | |
| 6,357,101 B1 | 3/2002 | Sarh et al. | |
| 6,413,022 B1 | 7/2002 | Sarh | |
| 6,536,100 B2 | 3/2003 | Sarh et al. | |
| 6,729,809 B2 | 5/2004 | Sarh et al. | |
| 7,003,860 B2 | 2/2006 | Bloch et al. | |
| 7,174,982 B2 | 2/2007 | Kraus | |
| 7,311,162 B2 * | 12/2007 | Jeswine | B62D 49/0621 180/164 |
| 7,380,776 B2 | 6/2008 | Boyl-Davis et al. | |
| 7,416,176 B2 | 8/2008 | Hamann | |
| 8,006,362 B2 | 8/2011 | Sarh | |
| 8,019,472 B2 | 9/2011 | Montero SanJuan et al. | |
| 8,490,955 B2 | 7/2013 | Sarh et al. | |
| 8,573,070 B2 | 11/2013 | Sarh et al. | |
| 2004/0262866 A1 | 12/2004 | Kraus | |
| 2005/0263949 A1 | 12/2005 | Boyl-Davis et al. | |
| 2006/0277733 A1 | 12/2006 | Boyl-Davis et al. | |
| 2007/0132255 A1 | 6/2007 | Perlman et al. | |
| 2007/0235239 A1 * | 10/2007 | Urakami | B62D 57/024 180/164 |
| 2008/0077276 A1 * | 3/2008 | Montero Sanjuan | B21J 15/14 700/245 |
| 2010/0071192 A1 | 3/2010 | Sarh et al. | |
| 2012/0014759 A1 | 1/2012 | Sarh et al. | |
| 2012/0193500 A1 | 8/2012 | Kniss et al. | |
| 2012/0210802 A1 | 8/2012 | Sarh et al. | |
| 2013/0285399 A1 | 10/2013 | Sarh et al. | |
| 2014/0115850 A1 | 5/2014 | Gamboa | |
| 2014/0115860 A1 | 5/2014 | Sarh et al. | |
| 2014/0237793 A1 | 8/2014 | Gamboa | |
| 2016/0200454 A1 | 7/2016 | Gamboa | |
| 2016/0297547 A1 | 10/2016 | Gamboa | |

FOREIGN PATENT DOCUMENTS

| | | |
|---|---|---|
| CN | 101259858 | 9/2008 |
| CN | 101856731 | 10/2010 |
| CN | 102107371 | 6/2011 |
| CN | 102152818 | 8/2011 |
| CN | 201920661 | 8/2011 |
| CN | 102578975 | 7/2012 |
| EP | 0430161 | 6/1991 |
| EP | 1757514 | 2/2007 |
| GB | 2486013 | 6/2012 |
| JP | 60092173 | 5/1985 |
| JP | 60219172 | 11/1985 |
| JP | 3266781 | 11/1991 |
| KR | 100866843 | 11/2008 |
| WO | 2005105557 | 11/2005 |
| WO | 2008130193 A1 | 10/2008 |
| WO | 2012012034 | 1/2012 |

OTHER PUBLICATIONS

PCT/US2013/059842 International Search Report and Written Opinion dated Jan. 29, 2014.
PCT/US2013/058057 International Search Report and Written Opinion dated Nov. 28, 2013.
Office Action for Canadian Application No. 2,853,847 dated Jul. 24, 2015.
Office Action for U.S. Appl. No. 13/663,805 dated Aug. 27, 2015.
English translation of Search Report and Office Action for Chinese Patent Application No. 201380056752.3 dated Apr. 29, 2016.
Notice of Allowance for U.S. Appl. No. 13/663,805 dated Dec. 18, 2015.
Office Action for Canadian Patent Application No. 2,885,514 dated Feb. 12, 2016.
Chinese Office Action for Chinese Application No. 201380056752.3 dated Nov. 1, 2016.
Chinese Office Action for Chinese Application No. 201380052963.X dated Feb. 21, 2017 with English translation.
Canadian Office Action for Canadian Patent Application No. 2,853,847 dated Mar. 6, 2017.
Chinese Office Action for Chinese Patent Application No. 201380056752.3 dated Mar. 10, 2017.
Canadian Office Action for Canadian Patent Application No. 2,853,847 dated Oct. 23, 2017.
Chinese Office Action for Chinese Patent Application No. 201410373377.1 dated Jul. 26, 2017.
Chinese Office Action and English translation for Chinese Patent Application No. 201410373377.1 dated Apr. 9, 2018.
Japanese Office Action and English translation for Japanese Patent Application No. 2014-156014 dated May 21, 2018.

* cited by examiner

Symbol Legend

◎ = Suction cup vacuum on
◯ = Suction cup vacuum off
△ = Ball deployed
□ = Ball retracted
× = Leg fixed
+ = Leg floating

Primary leg (◯) functions — 502

| ◎ | △ |
|---|---|
| ◎ S.C. vacuum on | ◯ S.C. vacuum off |
| □ Ball retracted | △ Ball deployed |

Secondary leg (◯) functions — 504

| ⊞ | ⊠ | ⊕ |
|---|---|---|
| ◎ S.C. vacuum on | ◎ S.C. vacuum on | ◯ S.C. vacuum off |
| □ Ball retracted | □ Ball retracted | △ Ball deployed |
| + Leg floating | × Leg fixed | + Leg floating |

FIG. 5A

MULTIFUNCTION LEGS FOR AUTONOMOUS CRAWLING ASSEMBLY EQUIPMENT

CLAIM OF PRIORITY

This patent application is a continuation-in-part of U.S. patent application Ser. No. 13/663,838, filed on Oct. 30, 2012, and having the title "AUTONOMOUS CRAWLING ASSEMBLY SYSTEM;" and of U.S. patent application Ser. No. 13/663,805, filed on Oct. 30, 2012, and having the title "DUAL FUNCTION MOVEMENT COMPONENT FOR AUTOMATED ASSEMBLY SYSTEMS." Each of the above stated applications is hereby incorporated herein by reference in its entirety.

BACKGROUND

Manufacturers, including aircraft manufactures for example, are under continuous pressure to reduce costs associated with and/or to enhance efficiency of manufacturing processes. In this regard, manufacturing a particular article (e.g., aircraft) may require performing various steps to produce a complete example of the article. The type of steps undertaken in a manufacturing process may be dictated by the article itself (e.g., number, size, and/or shape of components), and/or by other conditions pertinent to the manufacturing process (e.g., separate production of components of the article). For example, manufacturing aircraft may require assembling components, such as fuselage or wing sections, which may be made separately, sometimes at different locations and/or by different sub-contractors. In some instances, automated devices may be utilized during manufacturing processes. In this regard, automated devices may be fixed, with the manufactured article (or components thereof) being moved (e.g., via an assembly line) to allow the automated devices to operate (e.g., applying fastening bolts). Alternatively, the automated devices may be configured as moving devices that traverse the manufactured article (or component(s) thereof) while operating on the article (or component(s)). For example, in aircraft manufacturing automated systems capable of crawling over aircraft structures may be used, being configured to accurately position at particular location (e.g., over a fastener location), and to perform necessary operations thereat (e.g., processing the needed hole and installing a fastener).

Use of such automated systems may pose certain challenges, however. For example, challenges associated with this type of automated systems may include or relate to performing necessary course adjustments and/or enhancing the manner in which the system moves from one location to the next. In this regard, many currently available systems suffer from such limitations as low speed of movement over structure and/or skidding during course adjustments, as a result of, for example, the means currently used in securing such automated systems to the structures and/or moving them on these structures. For example, some current systems may utilize vacuum cups to adhere the system to structures. Use of such vacuum cups, however, may necessitate deactivating the vacuum cup and pulling them away from structure before movement of the system. As for course adjustments, current systems may utilize rotation of support legs or feet to turn the system and make course adjustments. This, however, may lead to skidding of the pressure foot and is a less controlled steering method. Therefore, it would be advantageous to have an apparatus and method for providing automated assemblies in a manner that enhances speed and/or movement of machines used during assembly of articles, such as aircraft.

Further limitations and disadvantages of conventional and traditional approaches will become apparent to one of skill in the art, through comparison of such systems with some aspects, as set forth in the remainder of the present application with reference to the drawings.

SUMMARY

An apparatus and/or method is provided for multifunction legs for autonomous crawling assembly equipment, substantially as shown in and/or described in connection with at least one of the figures, as set forth more completely in the claims.

In one aspect, an apparatus may be used in assembling or manufacturing operations, comprising an automated motorized device that is operable to move on a structure for use in assembling of the structure. The automated motorized device may comprise an end effector that may be configured to perform a plurality of assembling related functions; and plurality of multifunction movement components which may be attached to a first movement assembly and a second movement assembly. In this regard, each multifunction movement component may perform a plurality of functions, comprising at least an adhering function and a rolling function. Furthermore, each multifunction movement component may comprise a sealing element for use in performing the adhering function, and a rolling element for use in performing the moving function. In this regard, the sealing element may be configured to create a seal around a chamber, defined by the sealing element, when the sealing element is in contact with a surface, by application of pneumatic suction into the chamber, thus urging a corresponding multifunction movement component onto the surface. The rolling element may be configured to move on a surface when in contact with the surface, the rolling element becoming in contact with the surface by deploying the rolling element such that any seal by the sealing element is prevented or broken.

In another aspect, an apparatus may comprise a multifunction movement component for use in automated motorized assembly systems. The movement component may comprise a sealing element that may be configured to create a seal around a chamber, defined by the sealing element, when the sealing element is in contact with a surface, by application of pneumatic suction into the chamber, thus urging a corresponding movement component onto the surface; a rolling element that may be configured to move on a surface when the rolling element is in contact with the surface, the rolling element becoming in contact with the surface by deploying the rolling element such that any seal by the sealing element is prevented or broken; and a piston that may be configured to dispose within a secondary chamber. In this regard, the piston may be operatively attached to the rolling element, and may be controlled to retract when a seal around the chamber is desired, and to extend to deploy the rolling element when the seal is not desired and/or movement is desired.

In yet another aspect, a method for performing assembling or manufacturing operations using an automated motorized device, which may be operable to move on a structure for use in assembling of the structure, may comprise positioning an end effector of the automated motorized device, at each of a plurality of predetermined locations of the structure, wherein the end effector may be configured to apply one or more of a plurality of assembling related functions at each of the plurality of predetermined locations; and moving the automated motorized device to each of the plurality of predetermined locations by use of a first movement assembly and a second movement assembly. In this regard, the first movement assembly may comprise one or more primary multifunction movement components and one or more secondary multifunction movement components; and the second movement assembly may comprise one or more secondary multifunction movement components. The functions of each of the primary and secondary movement components may comprise adhering and rolling. In addition, the secondary movement component may also be configured to provide floating function. Moving the automated motorized device may comprise securing one of the first movement assembly and the second movement assembly to the structure while the other one of the first movement assembly and the second movement assembly moves over the structure. The adhering may be performed using a sealing element that may be configured to create a seal around a chamber, defined by the sealing element, when the sealing element is contact with a surface, by application of pneumatic suction into the chamber, thus urging a corresponding movement component onto the surface; and the rolling may be performed using a rolling element that may be configured to move on a surface when the rolling element is in contact with the surface, the rolling element becoming in contact with the surface by deploying the rolling element such that any seal by the sealing element is prevented or broken.

These and other advantages, aspects and novel features, as well as details of an illustrated embodiment thereof, will be more fully understood from the following description and drawings.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIGS. 5A and 5B illustrate example movement of an autonomous crawling assembly system during assembly operations.

DETAILED DESCRIPTION

Certain embodiments may be found in a method and system for multifunction legs for autonomous crawling assembly equipment. Many specific details of certain embodiments are set forth in the following description as well as the drawings to provide a thorough understanding of such embodiments. One skilled in the art, however, will understand that there may be additional embodiments, or that certain of these embodiments may be practiced without several of the details described in the following description. Like numbers refer to like elements throughout.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1:
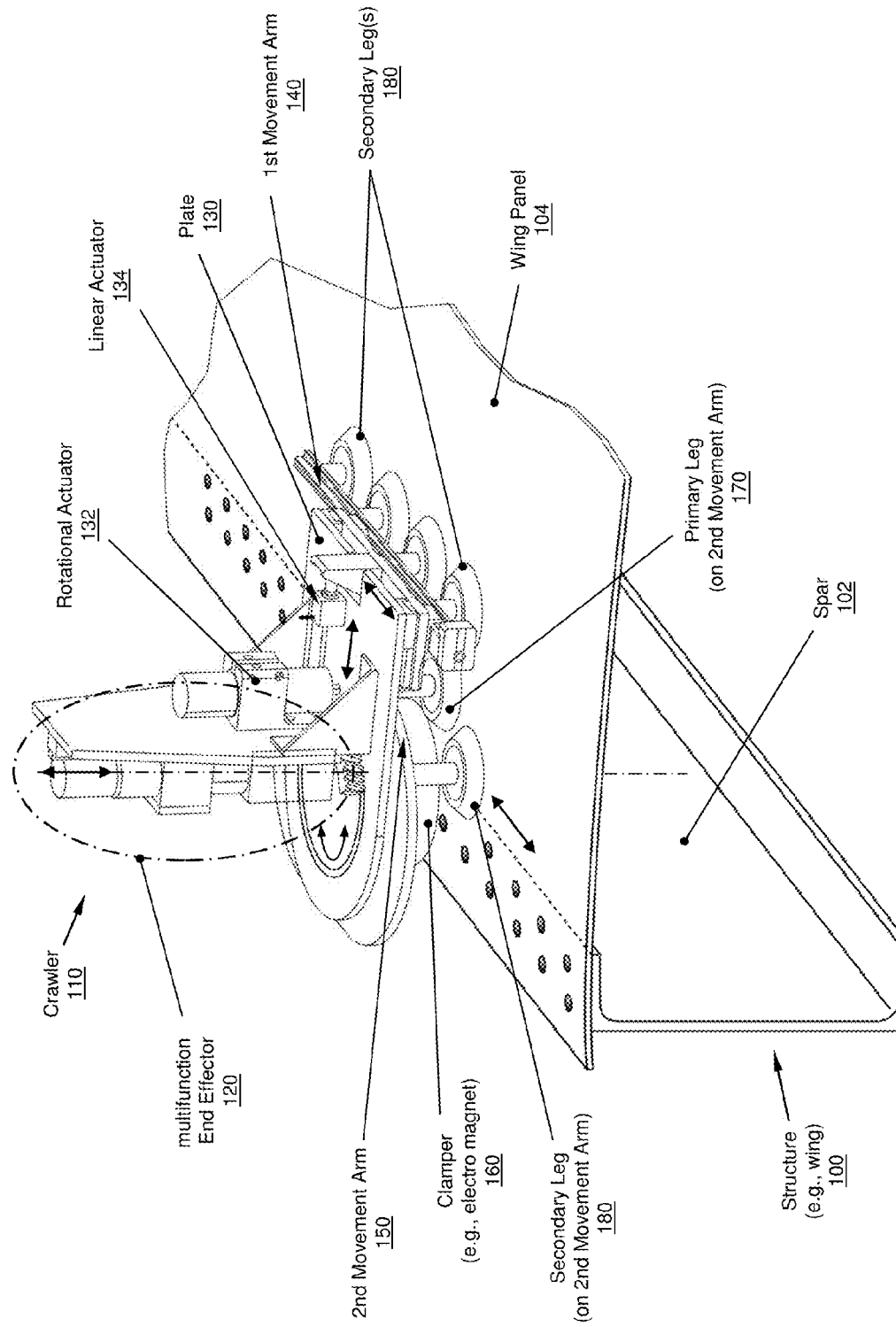
FIG. 1 illustrates an autonomous crawling assembly system, incorporating multifunction legs, which may be used during assembly of component(s), such as during manufacturing of aircraft.

FIG. 1 is a diagram illustrating an autonomous crawling assembly system, incorporating multifunction legs, which may be used during assembly of component(s), such as during manufacturing of aircraft, in accordance with an advantageous embodiment. Referring to FIG. 1, there is shown a crawler system 110.

The crawler system 110 may comprise a portable, automated motorized device which may be operable to move on a physical object, such as during assembly of the physical object of component thereof, and may be used in performing particular operations, such as assembling related operations (e.g., a drilling, bolting, and/or fastening), in a controlled manner. For example, the crawler system 110 may be used during manufacturing and/or assembly of aircraft or components thereof (e.g., fuselage or wings). In this regard, the crawler system 110 may preferably be placed on a structure 100 (e.g., a wing), and may then move over the structure 100 while performing assembling related operations thereon, at different locations (e.g., intended bolting positions on the wing).

The crawler system 110 may comprise a plurality of components performing various operations in support of intended functions of the crawler system 110. For example, as shown in FIG. 1, the crawler system 110 may comprise a multifunction end effector 120, a first movement arm 140 and a second movement arm 150, and a clamping component ('clamper') 160. The crawler system 110 may also comprise additional means for performing other/secondary functions such as holding, pivoting and/or rotating. In this regard, the holding function may pertain to 'holding' various components of the crawler system 110, whereas the pivoting and/or the rotating functions may relate to adjusting positioning of components of the crawler system 110 (including relative to other components).

The multifunction end effector 120 may be configured to perform one or more assembling related operations or functions, which may be utilized during manufacturing of articles, such as aircraft or components thereof. For example, the multifunction end effector 120 may be configured to perform such functions as drilling bolting holes and/or applying fastening bolts. Use of such functions may be made, for example, during assembling of aircraft wings. In this regard, assembling functions applied by the multifunction end effector 120 to the wing 100 may enable bolting a spar 102 to a wing box 104.

The first movement arm 140 and the second movement arm 150 may enable, individually and/or in combination (and/or in conjunction with other components of the crawler system 110), moving the crawler system 110 along the structure (e.g., the wing 100, or more specifically on the wing box 104) to which the functions of the multifunction end effector 120 may be applied (e.g., installing fasteners). In this regard, the first movement arm 140 and the second movement arm 150 may be configured such as to provide, while operating individually and/or in combination, autonomous movement of the crawler system 110, in a controlled manner that may enable optimizing operation of the crawler system 110 (and/or functions performed thereby—e.g., assembling related functions), such as by enhancing speed of movement of the crawler system 110 without compromising (or even with improvement to) the holding (or securing of) the crawler system 110 to the structure 100. This may be achieved, for example, by incorporating into each of the first movement arm 140 and the second movement arm 150 a plurality of multifunction movement components.

For example, as shown in FIG. 1, the crawler system 110 may incorporate two types of multifunction movement components: primary legs 170 and secondary legs 180. In this regard, each of the primary legs 170 and the secondary legs 180 may be configured to provide multiple functions related to support and movement of the crawler system 110. For example, each primary leg 170 or secondary leg 180 may be configured to provide both of an adhering (or holding) function (e.g., relating to securing the crawler system 110 to the structured being traversed), and a moving function (e.g., relating to moving the crawler system over the structured being traversed). In an example implementation, each of the primary leg 170 or secondary leg 180 may comprise a suction cup component that may be configured to provide a securing function—i.e., enabling 'holding' the corresponding leg (primary or secondary) to a surface, such as by use of vacuum created via the suction cup. Additionally, the each of the primary leg 170 or secondary leg 180 may comprise a rolling component that may be deployed to provide the 'rolling' function—i.e., facilitating or enabling moving of the leg (primary or secondary), and the corresponding arm to which the leg is attached—e.g., by rolling over the structure. In addition, the secondary legs 180 may also incorporate additional mechanism/component to enable or allow 'floating' of the leg (e.g., allow vertical adjustment relative to the surface of the structure). Floating the secondary legs in this manner may be desired as it may allow keeping multiple legs in contact with the surface, even in curved sections of the structure. Detailed example implementations of primary and secondary legs are described in more details in at least FIGS. 2-4, as follows.

In some instances, the crawler system 110 may comprise holding component(s), which may be utilized in connecting and holding various components of the crawler system 110. For example, the holding function may comprise use of connecting elements, such as a holder plate 130 for example, which may be utilized in connecting (and holding) various elements of the crawler system 110 (e.g., the movement arms 140 and 150, and/or the multifunction end effector 120). In this regard, the holder plate 130 may be used in connecting (and holding) the first movement arm 140 and the second movement arm 150. The holder plate 130 may comprise 'track' or 'rail' elements—e.g., to allow one or both of the movement arms (the first movement arm 140 and the second movement arm 150) to slide (or rotate) through the holder plate 130 for example. For example, the holder plate 130 may be connected to one of the movement arm (e.g., the first movement arm 140) such that connection point(s) between the holder plate 130 and the movement arm may be adjusted, to allow the movement arm to slide (linearly) relative to the holder plate 130. On the other hand, the holder plate 130 may be connected to the other movement arm (e.g., the second movement arm 150) such that the connection point(s) between the holder plate 130 and the other movement arm may be fixed or may allow for rotational (pivotal) adjustments. In other words, the holder plate 130 and (the second movement arm 150) may be rotated relative to the other movement arm (the first movement arm 140).

In some instances, to enhance use of the movement components of the crawler system 110 (e.g., the first movement arm 140 and the second movement arm 150), the crawler system 110 may comprise rotating/pivoting means, which may be used to allow for (when needed) rotating of particular components of the crawler system 110, in a controlled manner and (preferably) independent of other components of the crawler system 110 (i.e. while maintaining positioning of other components or allowing moving them in different manner). For example, the crawler system 110 may incorporate one or more actuators (e.g., a rotational actuator 132 and/or a linear actuator 134), which may be utilized to allow adjusting positioning (linearly and/or rotationally) of one or more components of the crawler system 110 (e.g., the multifunction end effector 120) relative to the remaining components of the crawler system 110. In this regard, the rotation actuator 132 and/or the linear actuator 134 may be utilized to allow for rotating or pivoting of particular components of the crawler system 110, such as the multifunction end effector 120, the first movement arm 140, and/or the second movement arm 150 which may allow for rotating one or more of these components while the other component(s) or the crawler system 110 is secured to the structure. Doing so may enhance movement of the crawler system 110, such as by allowing at least part of any needed movement adjustment (e.g., course change) to be performed while the crawler system 110 is being utilized for its intended function (e.g., while the multifunction end effector 120 is being utilizing to apply assembling related functions). For example, the rotation actuator 132 and/or the linear actuator 134 may be utilized to ensure that the multifunction end effector 120 remains unmoved (e.g., while it is being utilizing to apply assembling related functions) even while one or both of the first movement arm 140 and the second movement arm 150 are being rotated or pivoted.

In various implementations, the crawler system 110 may be configured to move and/or operate in optimized manner compared to existing systems. In this regard, there may be various challenges associated with use of automated assembling systems, particularly with respect to course adjustments and/or the manner by which in which the system moves from one location to the next. For example, many currently available systems suffer from such limitations as low speed of movement over structure(s) and/or skidding during course adjustments, as a result of currently used means for securing or holding such automated systems to the structures and/or for moving them (or adjusting the course of movement) on the structure(s). To achieve the desired enhancements in terms of speed of movement, course or movement adjustments, and/or reliability of system's 'holding' onto the structure(s), the crawler system 110 may incorporate various components (or enhancements to components). The crawler system 110 may incorporate, for example, a plurality of movement related components (e.g., legs and/or arms), which may be configured to enable performing at least a portion of required movement (or adjustment of course thereof) while the crawler system 110 is being used to apply assembling related functions. In this regard, the movement related components may be configured to support performing multiple functions related to movement operations. The application of these functions may be done in combined manner, to further enhance performance of the crawler system 110 (particularly during movement thereof). For example, during use of the crawler system 110, some of the movement related components (e.g., legs, primary or secondary, of one movement arm) may be configured to perform one function (e.g., 'holding' or 'securing' to the structure) while other movement components (e.g., legs, primary or secondary, of another movement arm) are being configured to perform another function (e.g., movement related functions, such as 'rolling' or 'sliding' over the structure for example). In some instances, and to account for variations in the surface of the traversed structure, some of the movement related components (e.g., secondary legs) may be configured (e.g., by application of a 'floating' function) to allow for adjustments based on the contours of the surface. Some examples of the various implementations of particular movement components (e.g., legs) that may be used in the crawler system 110, and/or use thereof during operations of the crawler system 110, are described in the following paragraphs relating to, for example, FIGS. 2-4.

In an implementation, the crawler system 110 may comprise clamping or securing means (e.g., the clamper 160), which may be used to ensure that the multifunction end effector 120 is firmly secured to the structure 100 to which the assembling functions are applied by the multifunction end effector 120. For example, the clamper 160 may comprise a non-permanent magnet which may be activated (e.g., using electric current) when the multifunction end effector 120 needs to be secured to the structure (e.g., when the multifunction end effector 120 is positioned at a location on the wing box 104 where a fastening bolt is to be applied); otherwise, the magnet which may be deactivated, such as when the crawler system 100 (or parts thereof, such as the multifunction end effector 120) may be moving.

In an implementation, one or more legs (primary and/or secondary legs) may be attached to other components of the crawler system 110—i.e., in addition to the first movement arm 140 and the second movement arm 150. For example, in some instances, a primary leg 170 may be attached to the holder plate 130. Doing so may be desired as it may allow for increase number of available legs and/or to ensure contact (sealed or rolling) with large surface of the surface. In some instances, functions the primary leg 170 attached to the holder plate 130 may be correlated to other legs (e.g., the primary legs of the second movement arm 150).

In an implementation, the crawler system 110 may also comprise one or more motors (not shown), which may be utilized to enable and/or support the automated motorized movement of the crawler system 110, such as by driving and/or enabling functions of at least some of components of the crawler system 110 used in conjunction with movement and/or use of the crawler system 110 (e.g., rotating/securing component of the multifunction end effector 120, the first movement arm 140, and/or second movement arm 150).

In an implementation, the crawler system 110 may also comprise one or more sensors (not shown), which may be utilized to enable and/or support sensing details of the structure (or particular the surface thereof) that the crawler system 110 is traversing. The obtained sensory information may then be utilized to better control operations of the crawler system 110 (e.g., determine necessary rotation, floating, etc.).

In an implementation, the crawler system 110 may comprise a controller component (not shown) for controlling various operations and/or components of the crawler system 110. In this regard, the controller component may comprise a programmable circuitry providing control signals to at least some of the components of the crawler system 110, to enable configuring these components to perform various operations in support of the functions of the crawler system 110. For example, the controller component may control operations of the movement component of the crawler system 110.

In an implementation, the crawler system 110 may be configured to receive and/or transmit information, such as by incorporating a communication component for providing and/or handling communications to and/or from the crawler system 110. In this regard, the crawler system 110 may receive, for example, user input, which may be used in controlling and/or adjusting various operations or functions of the crawler system 110. The user input may comprise, for example, movement related commands, such as "start" or "stop" and/or other similar commands. The communication component may also be configured to enable transmitting status information, such as information relating to various components or functions of the crawler system 110. The status information may be transmitted to other devices that may be utilized by users (e.g., a computer). The reception and/or transmission may be performed wirelessly, using one or more appropriate technologies. For example, communications may be via infra-red (IR) signals, near field communication (NFC) signals, Bluetooth signals, and/or WiFi signals. This disclosure is not limited, however, to any particular communication technology.

Figure 2:
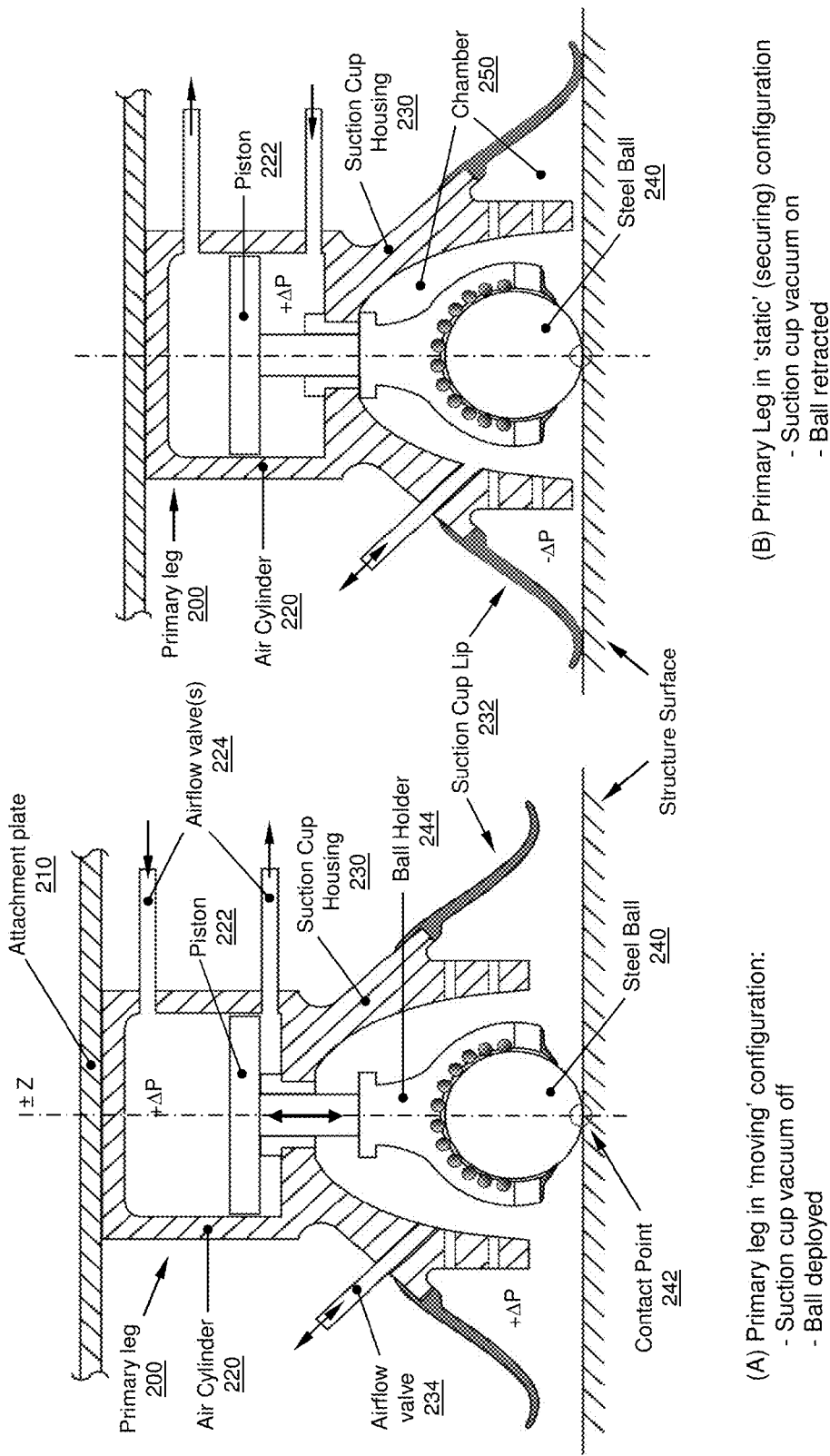
FIG. 2 illustrates a primary multifunction leg for use in autonomous crawling assembly equipment.

FIG. 2 illustrates a primary multifunction leg for use in autonomous crawling assembly equipment. Referring to FIG. 2, there is shown a primary leg 200.

The primary leg 200 may represent a first type of multifunction movement component that may be incorporated into portable, automated assembly systems, such as the crawler system 110 of FIG. 1. In this regard, the primary leg 200 may correspond to each of the primary legs 170 of FIG. 1. The primary leg 200 may be affixed (attached) to an attachment plate 210, which may be part of the assembly system. In this regard, the attachment plate 210 may represent a section of a movement assembly (arm), or other non-movement component of the assembly system, to which legs may be attached. For example, with reference to the crawler system 110 of FIG. 1, the attachment plate 210 may correspond to section of the first movement arm 140, the second movement arm 150, or the holder plate 130.

The primary leg 200 may be operable to provide or enable various functions that may be pertinent to the movement of the assembly systems, during assembling operations, in a controlled manner. For example, the primary leg 200 may be configured to a moving function (i.e. enable or support movement of the system), and a securing function (e.g., enabling securing the system to traversed structures).

The primary leg 200 may comprise various elements, which may be designed, set up, and/or configured based on, for example, the functions supported by or in which the primary leg 200 may be configured. For example, the primary leg 200 may comprise one or more elements configured to provide or support the securing ('holding' or 'adhering') function. The primary leg 200 may utilize, for example, a suction cup component to provide the securing function. In this regard, the securing (or 'holding') onto a surface may be provided by use of vacuum to create a pulling force to enable securing the primary leg 200 to a surface with which the suction cup may be in contact. For example, the suction cup may comprise a suction cup housing 230, to which a sealing element (e.g., suction cup lip 232) is attached, with the section cup housing 230 and the sealing element (the section cup lip 232) defining a chamber (cavity or space) 250, within which vacuum may be created to generate the 'holding' force. In other words, the section cup lip 232 may be utilized to provide the sealing, between the chamber 250 and the surface, required to create the necessary vacuum for generating the 'holding' force. The vacuum in the chamber 250 may be created by application of pneumatic suction of the air from the chamber 250, via an airflow valve 234 running through suction cup housing 230. In this regard, a pump or vacuum source may be connected to the airflow valve 234 (e.g., using a tube) to allow applying air suction. In some instances, the airflow valve 234 may be utilized to apply pneumatic (e.g., air) injunction into the chamber 250. This may be done, for example, when breaking the seal is desired.

The primary leg 200 may comprise one or more elements configured to provide the moving function. For example, the primary leg 200 may comprise a rolling component, which may be utilized to enable moving the primary leg 200 by means of rolling on the traversed surface. The rolling component may comprise a ball (e.g., steel ball) 240 that is held by a ball holder 244. The ball 240 may be configured to roll freely within the ball holder 244, such as by means of lubrication, mini bearing balls, or the like. Thus, when the ball 240 is contact with the surface, the primary leg 200 may be operable to move on the surface as result of the ball 240 rolling within its ball holder 244. The ball 240 (and its holder 244) may be configured to move vertically (i.e., in the Z direction, relative to the surface) within the primary leg 200. This may enable retracting the ball 240 when the securing function is being applied, and/or to retract the ball 240 when the moving function is being applied. For example, the primary leg 200 may incorporate a pneumatic (e.g., air) cylinder 220 that may be utilized to enable the vertical movement of the ball 240. For example, the air cylinder 220 may be attached to the section cup housing 230, with the ball 240 (via its ball holder 244) being connected to a piston 222 that may move within an internal chamber inside the air cylinder 220. In this regard, the piston 222 may be moved by application of pneumatic (air) injunction or suction, via one or more airflow valves 224.

Accordingly, the ball 240 may be retracted by moving the piston 222 up, and may be deployed by moving the piston down within the air cylinder 220. In this regard, the amount of movement of the piston (e.g., based on the dimensions of the internal chamber of the air cylinder 200) may be configured such that at its lowest point (relative to the surface), the ball 240 extend beyond the suction cup lip 232, whereas positioning the piston 222 higher within the chamber (e.g., close to its highest point, relative to the surface) would retract the ball 240 within the chamber 250.

In an example use scenario, when the primary leg 200 is configured to provide moving function, the ball 240 may be deployed—e.g., by moving the piston 222 down (in the Z direction), such as by application of air injunction above the piston 222 within the air cylinder 220, thus creating positive air pressure (+$\Delta P$). Additionally, during deployment of the ball 240, any vacuum within the chamber 250 may be deactivated, such as by deactivating any air suction being applied via the airflow valve 234 (and in some instances, by application of air injection into the chamber 250, thus creating positive air pressure (+$\Delta P$) within that space). This may enable the ball 240 to easily break any seal as it is deployed beyond the suction cup lip 232. Once the ball 240 makes contact with the surface (e.g., at contact point 242), the ball 240 may roll freely (within its ball holder 244), thus allowing movement of the primary leg 200 over the surface. When the primary leg 200 is configured to provide securing (holding) function, such as during drilling/fastening process, the ball 240 may be retracted, and chamber 250 may be placed under vacuum—e.g., by application of air suction via the airflow valve 234, to create negative air pressure (−$\Delta P$), thus stabilizing the primary leg 200 on the part surface (in X,Y directions), while the position of the retracted ball 240 (providing a hard stop—i.e., it is stop such that it may remain nominally in contact with the surface, without affecting any seal being created by the suction cup lip 232), is stabilizing leg in Z direction.

Figure 3:
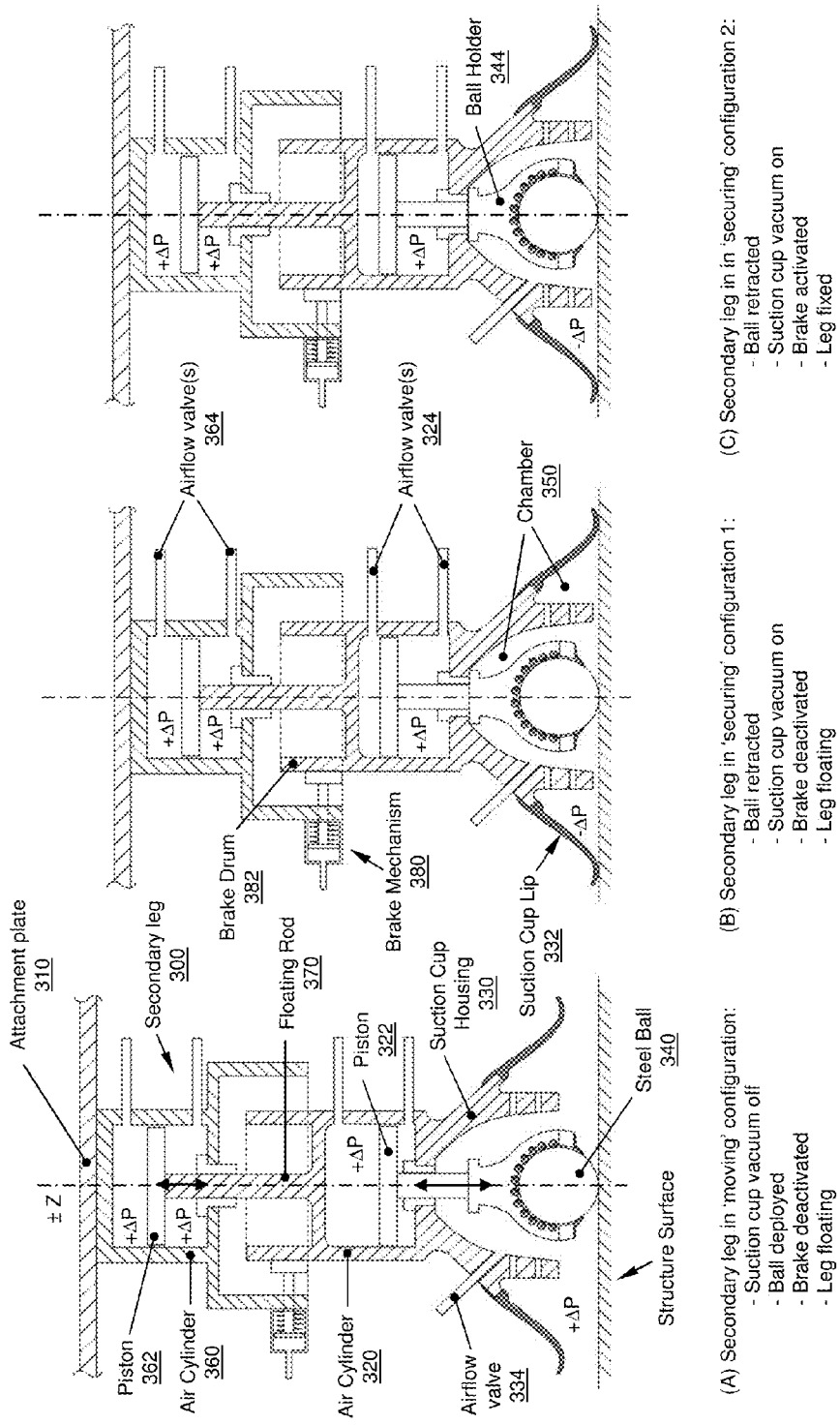
FIG. 3 illustrates a secondary multifunction leg for use in autonomous crawling assembly equipment.

FIG. 3 illustrates a secondary multifunction leg for use in autonomous crawling assembly equipment. Referring to FIG. 3, there is shown a secondary leg 300.

The secondary leg 300 may represent a second type of multifunction movement component that may be incorporated into portable, automated assembly systems, such as the crawler system 110 of FIG. 1. In this regard, the secondary leg 300 may correspond to each of the secondary legs 180 of FIG. 1. The secondary leg 300 may be affixed (attached) to an attachment plate 310, which may be part of the assembly system. In this regard, the attachment plate 310 may represent a section of a movement assembly (arm), or other non-movement component of the assembly system, to which legs may be attached. For example, with reference to the crawler system 110 of FIG. 1, the attachment plate 310 may correspond to section of the first movement arm 140, the second movement arm 150, or the holder plate 130.

As with the primary leg 200, the secondary leg 300 may also be operable to provide or enable various functions that may be pertinent to the movement of the assembly system, such as during assembling operations, in a controlled manner. For example, the secondary leg 300 may also be configured to a moving function (i.e. enable or support movement of the system), and a securing function (e.g., enabling securing the system to traversed structures). In addition, however, the secondary leg 300 may be configured to provide a 'floating' function. In this regard, when configured to float, the secondary leg 300 may float during system's linear and rotational motion—i.e., at least a section of the secondary leg 300 may move in vertical direction (e.g., in the Z direction). In other words, while the secondary leg 300 remains attached to the system (the attachment plate 310), the length of the secondary leg 300 may be adjusted, thus allowing the secondary leg 300 to maintain contact with the structure surface in compound regions (i.e., non-flat sections).

As with the primary leg 200, the secondary leg 300 may comprise various elements, which may be designed, set up, and/or configured based on, for example, the functions supported by or in which the secondary leg 300 may be configured. For example, the secondary leg 300 may comprise one or more elements configured to provide or support the securing ('holding' or 'adhering') function. In this regard, the secondary leg 300 may incorporate similar suction cup based implementation as with the primary leg 200, for enabling securing (or 'holding') the secondary leg 300 onto a surface using pneumatic pressure (e.g., vacuum) to create a pulling force between the secondary leg 300 and the surface. For example, the suction cup may comprise a suction cup housing 330, to which a sealing element (e.g., a suction cup lip 332) is attached, defining a chamber (cavity or space) 350, within which vacuum may be created (e.g., by application of pneumatic suction via an airflow valve 334) to generate the 'holding' force. In this regard, these elements may be similar to corresponding elements in the primary leg 200 (e.g., the section cup housing 230, the section cup lip 232, the airflow valve 234, and the chamber 250, as described with respect to FIG. 2).

The secondary leg 300 may comprise one or more elements configured to provide the moving function. In this regard, the secondary leg 300 may incorporate similar rolling based implementation as with the primary leg 200, for enabling moving the secondary leg 300 over the surface. For example, the secondary leg 300 may comprise a ball (e.g., steel ball) 340 that is held by a ball holder 344. In this regard, the ball 340 and the ball holder 344 may be similar to the ball 240 and the ball holder 244 of the primary leg 200, and may operate in similar manner, as described with respect to FIG. 2 for example. In this regard, as with the primary leg 200 of FIG. 2, the secondary leg 300 may incorporate a pneumatic (e.g., air) cylinder 320 that may be used in deploying and/or retracting the ball 340. For example, the air cylinder 320 may be attached to the section cup housing 330, with the ball 340 (via its ball holder 344) being connected to a piston 322 moving within an internal chamber inside the air cylinder 320, such as by application of pneumatic (air) injunction or suction, via one or more airflow valves 324.

In addition, the secondary leg 300 may comprise one or more elements configured to provide the floating function. For example, a first part of the secondary leg 300 (e.g., the portion corresponding to the primary leg 200, comprising the suction cup component/elements and the air cylinder 320) may be attached to a floating component, which may be implemented using pneumatic implementation. In this regard, the floating component may comprise a (second) pneumatic (air) cylinder 360, which may be utilized to enable the floating of the remaining part of the secondary leg 300. The air cylinder 360 may comprise a piston 362, which may move within an internal chamber inside the air cylinder 360. In this regard, the piston 362 may be moved by application of pneumatic (air) injunction or suction, via one or more airflow valves 364. The piston 362 may be connected, using a floating rod 370, to the (first) air cylinder 320, thus allowing for movement of that cylinder (and all other remaining components/elements attached thereto) vertically (in the Z direction, thus providing the desired 'floating'). Thus, the lower part of the secondary leg 300 may float by moving the piston 362 within the internal chamber of the air cylinder 360 (e.g., by application of pneumatic injection or suction, via the airflow valves 364).

In some instances, it may be desirable to disable the floating function. For example, once the secondary leg 300 floats onto new position on the surface (thus adjusting for any contours or variations), the secondary legs 300 may need to be prevent from further floating (e.g., when applying 'securing' function). Accordingly, the secondary leg 300 may comprise one or more elements for disabling or deactivating the floating function. For example, the secondary leg 300 may incorporate a breaking mechanism 380, which may be configured to adaptively apply breaking (e.g., by applying a 'locking' force against a break drum 382, which may be attached to the air cylinder 320. Thus, when the floating function is to be disabled, breaking may be applied (via the breaking mechanism 380), by locking the air cylinder 320 (and the rest of the floating part of the secondary leg 300) to prevent any further floating.

In an example use scenario, when the secondary leg 300 is configured to provide moving function, the ball 340 may be deployed—e.g., by moving the piston 322 down (in the Z direction), such as by application of air injunction above the piston 322 within the air cylinder 320, thus creating positive air pressure ($+\Delta P$). Additionally, during deployment of the ball 340, any vacuum within the chamber 350 may be deactivated, such as by deactivating any air suction being applied via the airflow valve 334 (and in some instances, by application of air injection into the chamber 350, thus creating positive air pressure ($+\Delta P$) within that space). This may enable the ball 340 to easily break any seal as it is deployed beyond the suction cup lip 332. Once the ball 340 makes contact with the surface (e.g., at contact point 342), the ball 340 may roll freely (within its ball holder 344), thus allowing movement of the secondary leg 300 over the surface. During moving function, the floating of the secondary leg 300 may typically be activating, to allow the secondary leg 300 (specifically the ball 340) to maintain contact as it moves over compound surfaces. This may be achieved by deactivated the breaking mechanism 380 (to allow vertical movement of the floating rod 370). In addition, air may be injected or sucked in the air cylinder 360 (above and/or below the piston 362) to provide sufficient downward force for ensuring that the ball 340 maintain contact as it adjusts to the contours of the traversed surface—i.e., provide just sufficient resistance to prevent the ball from jumping off the surface as it pushed, and that is continues to push downward as it moves over depresses sections of the surface.

When the secondary leg 300 is configured to provide securing (holding) function, such as during drilling/fastening process, the ball 340 may be retracted, and chamber 350 may be placed under vacuum—e.g., by application of air suction via the airflow valve 334, to create negative air pressure ($-\Delta P$), thus stabilizing the secondary leg 300 on the part surface (in X,Y directions). The floating function may be maintained (or activated), such as to prevent the ball 340 from accidently breaking the seal. Alternatively, in some instances, the floating of the secondary leg 300 may be deactivated (e.g., by the breaking mechanism 380) when the secondary leg 300 is configured for the securing function. This may be done, for example, to further stabilize the leg in the vertical (Z) direction.

Figure 4:
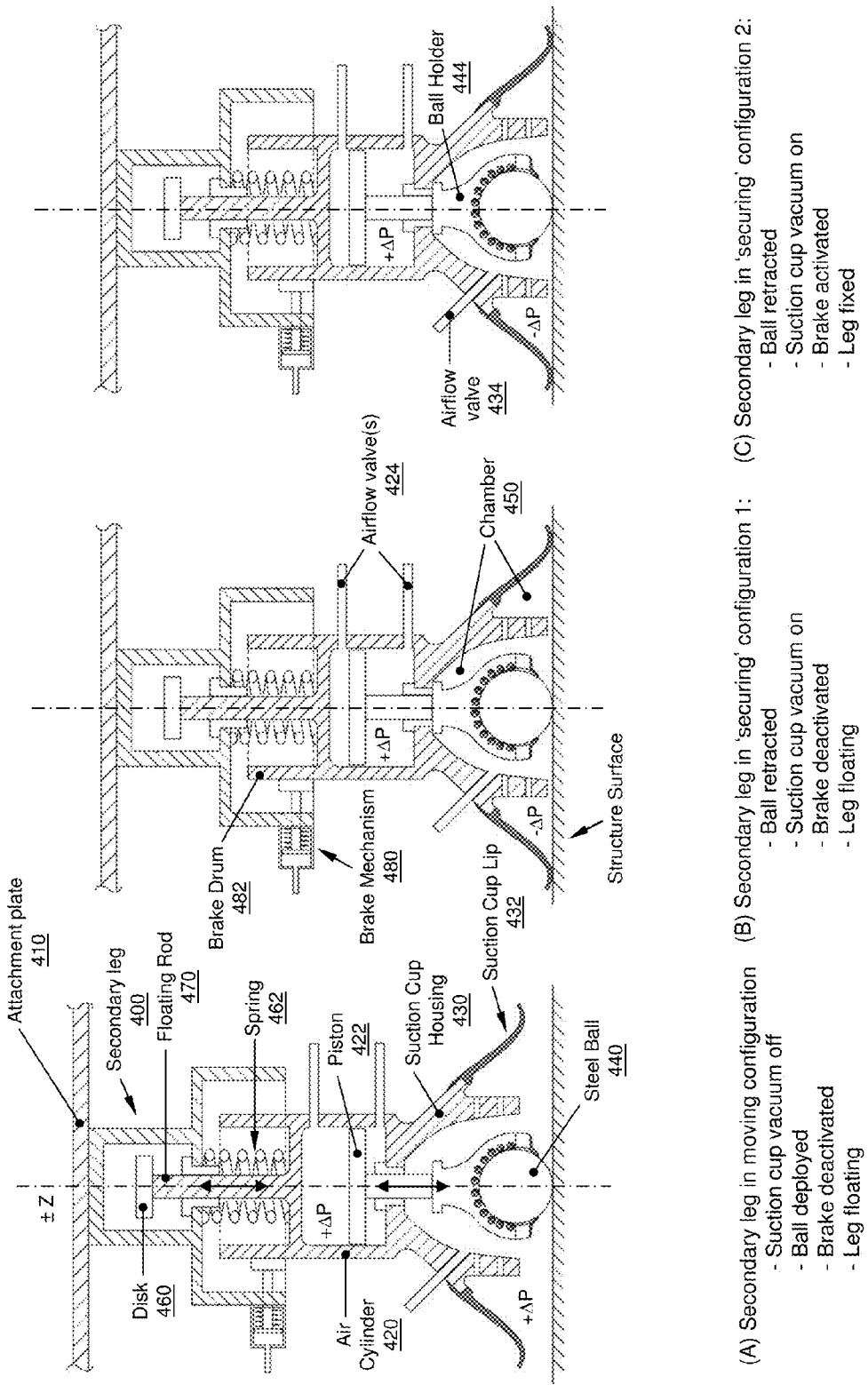
FIG. 4 illustrates alternate implementation of a secondary multifunction leg for use in autonomous crawling assembly equipment.

FIG. 4 illustrates alternate implementation of a secondary multifunction leg for use in autonomous crawling assembly equipment. Referring to FIG. 4, there is shown a secondary leg 400.

As with the secondary leg 300, the secondary leg 400 may also represent a second type of multifunction movement component that may be incorporated into portable, automated assembly systems, such as the crawler system 110 of FIG. 1. In this regard, the secondary leg 400 may correspond to each of the secondary legs 180 of FIG. 1. The secondary leg 400 may be affixed (attached) to an attachment plate 410, which may be part of the assembly system. In this regard, the attachment plate 410 may represent a section of a movement assembly (arm), or other non-movement component of the assembly system, to which legs may be attached. For example, with reference to the crawler system 110 of FIG. 1, the attachment plate 410 may correspond to section of the first movement arm 140, the second movement arm 150, or the holder plate 130.

The secondary leg 400 may be substantially similar to the secondary leg 300 of FIG. 3. In this regard, as with the secondary leg 300, the secondary leg 400 may also be operable to provide or enable various functions pertinent to the movement of the assembly system, such as during assembling operations, in a controlled manner, including moving function, securing function, and floating function. In this regard, the secondary leg 400 may comprise various elements, which may be designed, set up, and/or configured based on, for example, the functions supported by or in which the secondary leg 400 may be configured.

For example, the secondary leg 400 may comprise one or more elements configured to provide or support the securing function, using similar suction cup based implementation as with the secondary leg 300. For example, secondary leg 400 may comprise a suction cup housing 430, to which a sealing element (e.g., a suction cup lip 432) is attached, defining a chamber (cavity or space) 450, within which vacuum may be created (e.g., by application of pneumatic suction via an airflow valve 434) to generate the 'holding' force. In this regard, these elements may be similar to corresponding elements in the secondary leg 300 (e.g., the section cup housing 330, the section cup lip 332, the airflow valve 334, and the chamber 360, as described with respect to FIG. 3).

Also, the secondary leg 400 may comprise one or more elements configured to provide the moving function, using similar rolling based implementation as with the secondary leg 300. For example, the secondary leg 400 may also comprise a ball (e.g., steel ball) 440 that is held by a ball holder 444. In this regard, the ball 440 and the ball holder 444 may be similar to the ball 340 and the ball holder 344 of the secondary leg 300, and may operate in similar manner, as described with respect to FIG. 3 for example. In this regard, as with the secondary leg 300 of FIG. 3, the secondary leg 400 may incorporate a pneumatic (e.g., air) cylinder 420 that may be used in deploying and/or retracting the ball 440. The air cylinder 420 may also be attached to the section cup housing 430, with the ball 440 (via its ball holder 444) being connected to a piston 422 moving within an internal chamber inside the air cylinder 420, such as by application of pneumatic (air) injunction or suction, via one or more airflow valves 424.

In addition, as with the secondary leg 300, the secondary leg 400 may also comprise one or more elements configured to provide the floating function. However, unlike the secondary leg 300, the floating component of the secondary leg 400 is implemented using mechanical based implementation rather than pneumatic based implementation. In this regard, the floating component of the secondary leg 400 may comprise a disk 460, which may move within a corresponding chamber in a container section that is affixed to the attachment plate 410. The disk 460 may be connected, using a floating rod 470, to the air cylinder 420, thus allowing for movement of that cylinder (and all other remaining components/elements attached thereto) vertically (in the Z direction), based on movement of the disk 460, thus providing the desired floating. In this regard, the movement of the disk 460 within its chamber may be driven by a mechanical force, such as the as result of loading/unloading of a spring 462, which may be placed between the container of the disk 460 and the top of the air cylinder 420. Thus, the lower part of the secondary leg 400 may float when the disk 460 is moving within the internal chamber of the air cylinder 460 (e.g., by application of spring loading, via the spring 462).

As with the secondary leg 300, the secondary leg 400 may also comprise one or more elements for disabling or deactivating the floating function, such as by means of braking. For example, the secondary leg 400 may also incorporate a breaking mechanism 480, which may be configured to adaptively apply breaking, substantially as described with respect to the breaking mechanism 380 of the secondary leg 300 (e.g., by applying a 'locking' force against a break drum 482, which may be attached to the air cylinder 420).

Figure 5B:
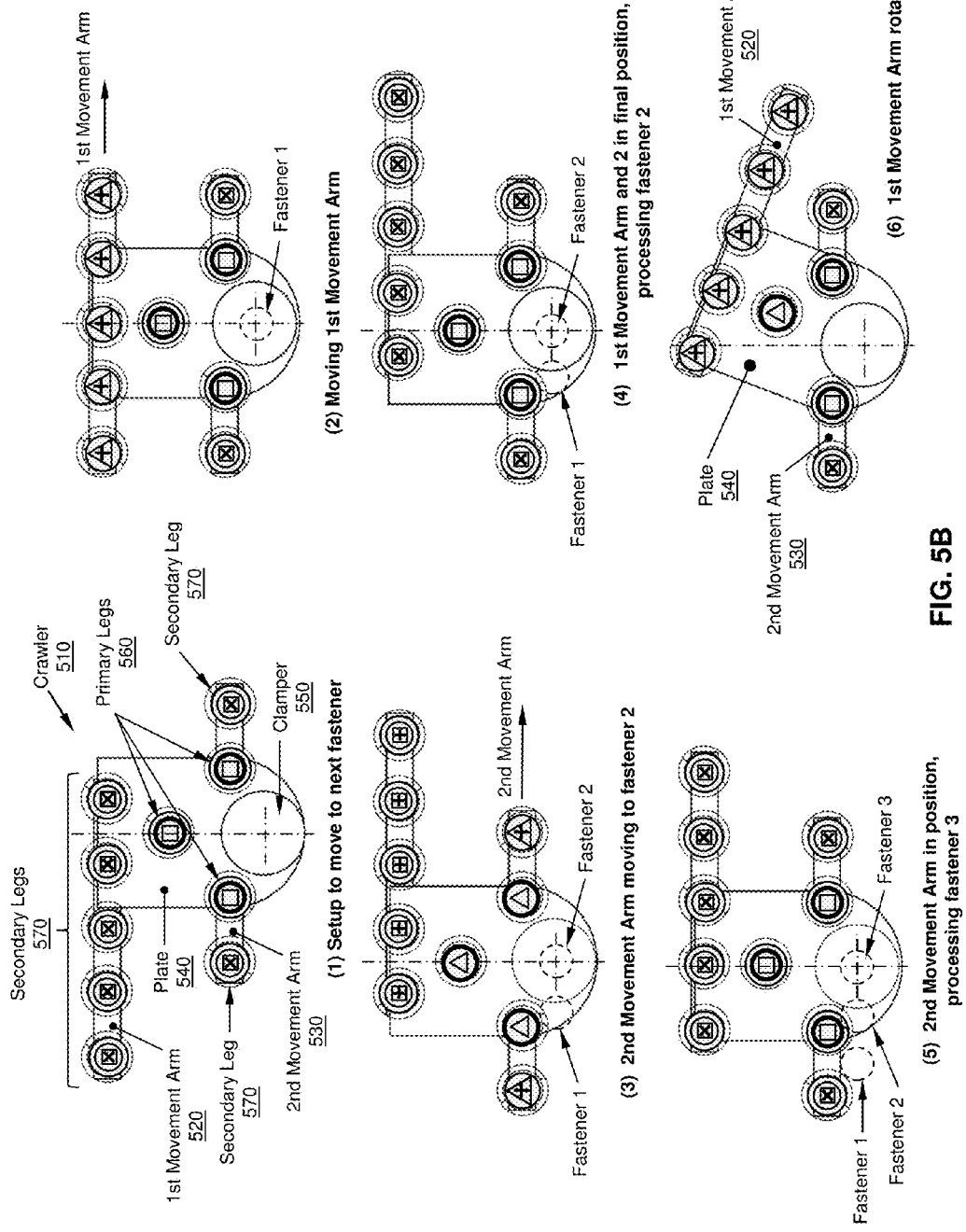

FIGS. 5A and 5B illustrate example movement of an autonomous crawling crawler system during assembly operations. Referring to FIGS. 5A and 5B, there is shown a crawler system 510.

The crawler system 510 may comprise a portable, automated motorized device that may be configured for performing particular operations (e.g., assembling related operations, such as drilling, bolting, and/or fastening) on a physical structure (e.g., aircraft or component thereof), and to do so while moving on the structure, in a controlled manner. The crawler system 510 may be substantially similar to the crawler system 110, as described with respect to FIG. 1 for example. As shown in FIG. 5B, the crawler system 510 may comprise, for example, a first movement arm 520, a second movement arm 530, a plate (holder) 540, and a clamper 550. Also, while shown expressly in FIG. 5B, the crawler system 510 may also comprise a multifunction end-effector, for use in performing various assembling related operations that may be provided by the crawler system 510. The components of the crawler system 510 may be similar to the similar components (e.g., similarly named components or elements) of the crawler system 110, substantially as described with respect to FIG. 1.

Furthermore, a plurality of primary legs 560 and/or secondary legs 570 may be incorporated into the crawler system 510, to enable providing movement and/or securing related functions. In this regard, each primary leg 560 may be similar to the primary leg 200, as described with respect to FIG. 2; whereas each secondary leg 570 may be similar to the secondary leg 300 or the secondary leg 400, as described with respect to FIGS. 3 and 4, respectively. The primary legs 560 and/or secondary legs 570 may be incorporated (attached) onto the crawler system 510 in various manners. In this regard, the legs (primary and/or secondary) may mainly be attached to the first movement arm 520 and the second movement arm 530. Additionally, in some instances, one or more legs may be attached to other components (e.g., the plate 540), such as to provide added stability and/or controllability. In the example implementation shown in FIG. 5B, only a number (e.g., five) of secondary legs 570 are attached onto the first movement arm 520; whereas a combination of primary legs 560 and secondary legs 570 (e.g., two of each) are attached onto the second movement arm 530. In addition, a single primary leg 560 is attached to the plate 540.

The primary legs 560 and/or secondary legs 570 may be configured to provide various functions that may pertinent to movement of the crawler system 110 and/or securing of the crawler system 110 onto traversed structures (or, specifically, surfaces of the structures). Examples function may comprise moving (e.g., rolling), adhering (securing), and/or floating. These functions may be performed by configuring various elements of the legs (e.g., section cups, air cylinders, rolling balls, etc.). Tables 502 and 504 of FIG. 5A show possible manners by which particular functions may be performed by primary and secondary legs, respectively. For example, as shown in table 502, for primary legs 560, the functions may comprise moving function (performed by, e.g., deactivation of suction/vacuum and deployment of ball), and adhering (securing) function (performed by, e.g., application of vacuum and retraction of ball). For secondary legs 570, as shown in table 504, the functions may comprise moving function (performed by, e.g., deactivation of suction/vacuum, deployment of ball, and activation of leg floating), fixed adhering (securing) function (performed by, e.g., application of vacuum, retraction of ball, and deactivation of leg floating), and floating adhering (securing) function (performed by, e.g., application of vacuum, retraction of ball, and activation of leg floating.

The crawler system 510 may be used to apply assembly related operations at a plurality of positions. In this regard, in the example use scenario shown in FIG. 5B, the crawler system 510 may be used to apply fasteners (e.g., by application of drilling and fastening installation) at different positions (i.e., install fasteners 1, 2 and 3). An example sequence of actions by the crawler system 510 for installing these fasteners may comprise, for example, starting in a first stage (1), in which the crawler system 510 may be placed over the to-be-assembled structure, such that the end-effector of the crawler system (not shown, but sitting on top of the center of the clamper 550) over the position of the first fastener (fastener 1). In this regard, initially the crawler system 510 is placed such that the plate 540 (and the thus the second movement arm 530 and end effector) may be at the out most right position relative to rail between the first movement arm 530 and the plate 540. The balls of all legs (primary legs 560 and secondary legs 570) of the crawler system 510 may initially be retracted and vacuum cups of all legs may be activated (and floating of the secondary legs 570 may be deactivated). This condition provides maximum stabilizing for all crawler system elements (arms, the plate 540, legs), and stabilizes the crawler system firmly on the part surface for drilling/fastening operation.

As fastener 1 is being installed, the crawler system 510 may initiate movement to the position of the next fastener (fastener 2). This may be done in a manner that does not affect the installation of fastener 1. For example, in stage (2), the first movement arm 520 may initiate movement to the next position. This may be achieved by releasing vacuum and deploying of balls of all secondary legs 570 of the first movement arm 520 (and, if necessary, floating one or more of the secondary legs 570 of the first movement arm 520 during that movement). Meanwhile, all primary legs 560 and secondary legs 570 on the second movement arm 530 (and the sole primary leg 560 of the plate 540) may maintain securing functions—e.g., by maintaining vacuum suction and ball retraction (and for any secondary legs 570, deactivation of floating—e.g., by maintain activation of braking), thus stabilizing the crawler system during the first movement arm 520 motion.

Next, in stage (3), the end effector may be moved from first to second fastener positions. This may be done by first allowing the secondary legs 570 attached to the first movement arm 520, to float (in the Z direction), such as by releasing their breaks. However, the balls may be retracted and vacuum cups may be put under vacuum, thus allowing for stabilizing these secondary legs 570 other directions (e.g., in X & Y directions). The secondary legs 570 on the second movement arm 530 may be allowed to float (in the Z direction), such as by deactivating their breaks, and the legs may be configured to allow for movement (e.g., in the XY plane), such as by deactivation vacuum in their vacuum cups, and deploying their balls. At the same time, the primary legs 560 of the second movement arm 530 and the plate 540, may be configured to allow for movement (e.g., by deactivating vacuum and deploying balls), thus creating condition whereby the triangle formed by the primary leg 560 triangle can move across compound surface (e.g., driven along the X-axis crawler system based on the secured the first movement arm 520). During movement of the second movement arm 530 and the plate 540 (with end effector) across compound surfaces, the primary leg triangle may change the orientation or normality of the crawler system, thus forcing secondary legs to float, which may be accomplished due to (even very small) Z forces pushing secondary legs 570 against the structure surface.

Next, in the fourth stage (4), the crawler system may be conditioned in position for processing the next fastener (fastener 2). In this regard, primary legs 560 may be configured to provide securing function (e.g., by retracting the balls and activating vacuum), thus gaining a stable condition for primary legs 560. Meanwhile, the secondary legs 570 attached to the second movement arm 530 may be configured for securing function (e.g., by retracting their balls and activating vacuum), to stabilize these legs as well to the surface. Also, the floating of all secondary legs 570 (i.e., both those attached to the first movement arm 520 and the ones attached to the second movement arm 530) may be disabled (e.g., by application/activation of breaking), thus achieving stable position is the other direction (e.g., Z direction). Accordingly, the crawler system may now be stabilized in the orientation dictated by primary leg triangle, and in a stable position for drilling/fastening process.

In stage (5), the crawler system 510 may be configured for applying of assembly operation corresponding to the next fastener (i.e. fastener 3). In this regard, the crawler system 510 may simply move to the next fastener by sliding the plate 540 (and the second movement arm 520) along the rail between it and the first movement arm 520. One in position, all legs (primary and secondary) may be configured to providing securing function (as described with respect to stage 4), thus stabilizing the crawler system during drilling/fastening operations.

In some instances, moving to new assembly positions (e.g., next fastener positions) may require rotating of the crawler system 510. For example, in stage (6), crawler system orientation may be adjusted (i.e., course of movement changed). In this regard, the second movement arm 530 may be stabilized to the surface using both the primary legs 560 (e.g., with balls retracted, and vacuum on) and the secondary legs 570 (e.g., with balls retracted, vacuum on, and floating disabled—by activation of breaking), while the first movement arm 520 is configured to move—e.g., by configuring its secondary legs 570 for movement (e.g., balls deployed, vacuum off, breaks deactivated), thus allowing for rotating of the first movement arm 520—e.g., driven by a rotation actuator. Furthermore, during rotation across compound surfaces, the crawler system orientation may again be dictated by the primary leg triangle configuration, with the secondary legs 570 (on the first movement arm 520) allowing for accommodation of the surface variation—e.g., by allowing for floating (in Z direction). Once the rotation is finished, all (i.e. on all primary legs 560 and secondary legs 570) of the crawler system are configured to provide securing function (e.g., balls are retracted, vacuum is applied, and for secondary legs 570, floating deactivated—e.g., by activating breaking) to gain stable configuration for all elements of the crawler system to proceed with drilling/fastening operation (at the next position).

Figure 6:
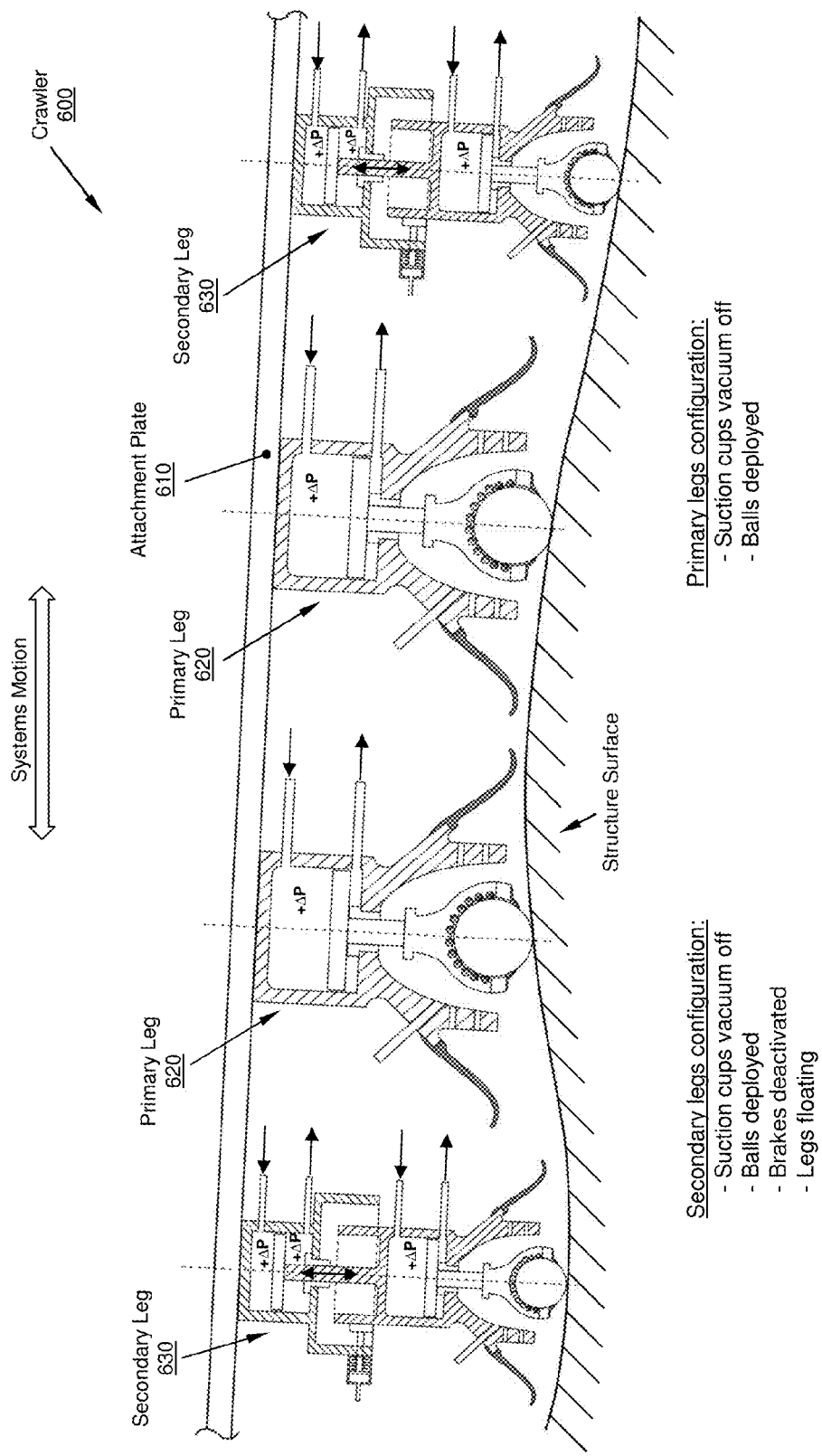
FIG. 6 illustrates placement of an example autonomous crawling assembly system, which utilizes primary and secondary multifunction legs, on a curved structure.

FIG. 6 illustrates placement of an example autonomous crawling assembly system, which utilizes primary and secondary multifunction legs, on a curved structure. Referring to FIG. 6, there is shown a crawler system 600.

The crawler system 600 may comprise a portable, automated motorized device which may be configured for performing particular operations on a physical structure (e.g., aircraft or component thereof), such as assembling related operations, and to do so while moving on the structure. The crawler system 600 may be substantially similar to the crawler system 510, as described with respect to FIGS. 5A and 5B for example. The crawler system 600 may comprise various components that may be configured to support or enable various operations or functions pertinent to the use of the crawler system 600 (e.g., in assembling operation). In particular, the crawler system 600 may comprise a plurality of multifunction movement components (or legs), which may be attached to the crawler system 600 (or components thereof—e.g., movement arms or assemblies).

For example, the crawler system 600 may incorporate two types of legs: primary legs 620 and secondary legs 630, for providing movement and/or securing related functions. In this regard, each primary leg 620 may be similar to the primary leg 200, as described with respect to FIG. 2; whereas each secondary leg 630 may be similar to the secondary leg 300 or the secondary leg 400, as described with respect to FIGS. 3 and 4, respectively. The primary legs 620 and/or secondary legs 630 may be incorporated (attached) onto the crawler system 600 in various manners. For example, in some instances, combination of the two types of the legs may be attached to single assembly (e.g., a movement arm). For example, as shown in FIG. 6, in some instances, a movement assembly may comprise a number of primary legs 620 and secondary legs 630 (e.g., two of each, as shown in FIG. 6) that are attached to a single attachment (holding) plate 610.

In an example use scenario, use of the different types of legs—particularly, the secondary legs 630, which may be allow for floating—may allow placement (and movement) of the crawler system 600 in a manner that may allow for accounting for the variations in the surface (e.g., in the case of compound surfaces). In this regard, to allow for accounting for the details of the traversed surface, and because the primary legs 610 maintain fixed position relative to the system platform, secondary legs 630 may be configured to adjust their positions. In this regard, when the crawler system 600 is initially placed on the structure, the secondary legs 630 may be configured to allow for floating (e.g., in Z direction), such as by deactivating their breaking mechanism (and, also, for secondary legs utilizing secondary air cylinders, by injecting air to allow for pushing of secondary pistons). Once the crawler system 600 adjusts to the counters on the compound surfaces, the floating may be deactivated (e.g., by activating their breaking mechanisms). Similarly, the secondary legs 630 may be configured to allow for floating during movement, to ensure that all legs maintain contact with the surface even when traversing a compound region.

Figure 7:
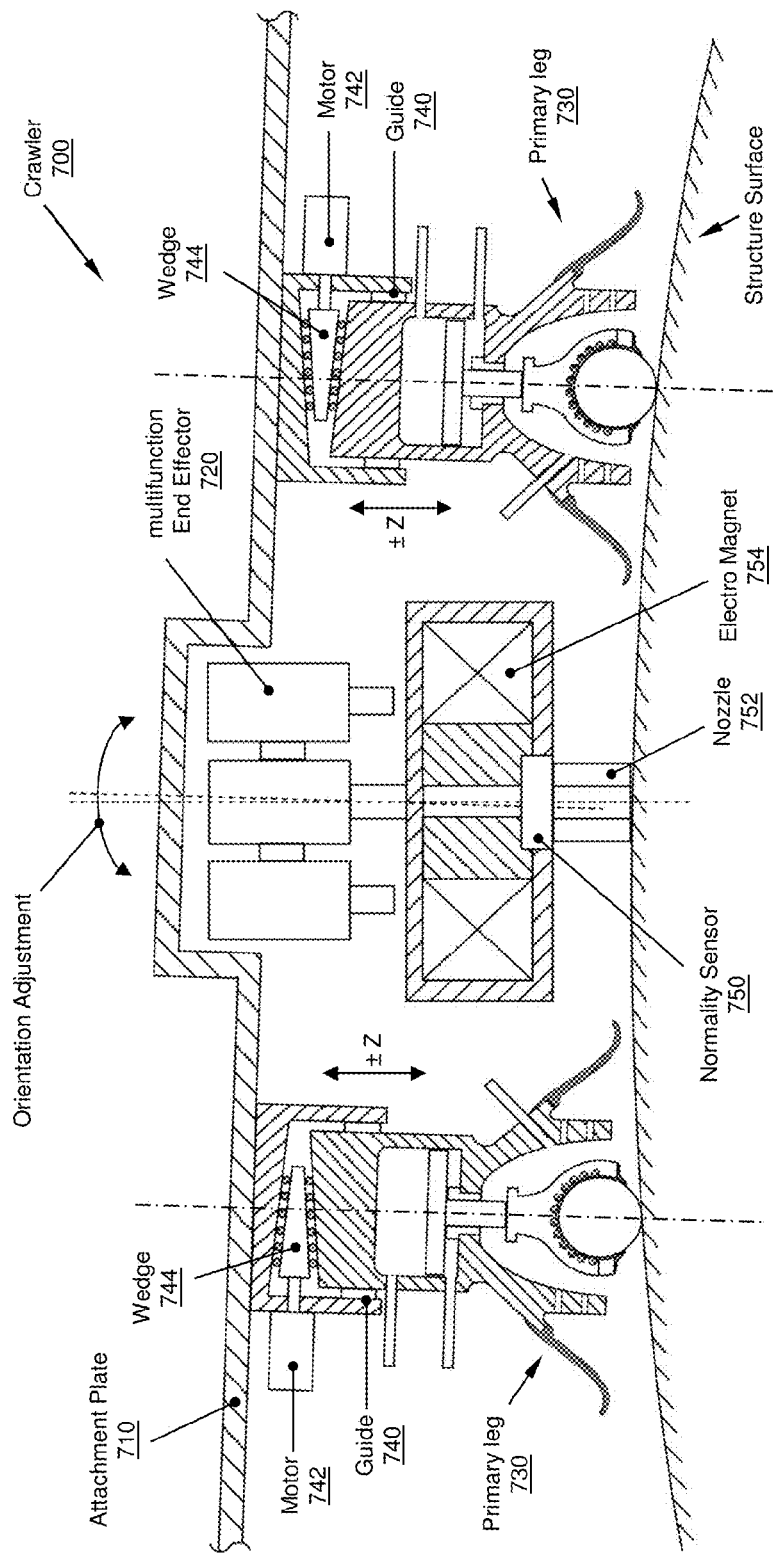
FIG. 7 illustrates use of an example autonomous crawling assembly system, which incorporates primary and secondary multifunction legs and support oriental adjustment.

FIG. 7 illustrates use of an example autonomous crawling assembly system, which incorporates primary and secondary multifunction legs and support oriental adjustment. Referring to FIG. 7, there is shown a crawler system 700.

The crawler system 700 may comprise a portable, automated motorized device which may be configured for performing particular operations on a physical structure (e.g., aircraft or component thereof), such as assembling related operations, and to do so while moving on the structure. The crawler system 700 may be substantially similar to the crawler system 110, as described with respect to FIG. 1 for example. In this regard, as with the crawler system 110, the crawler system 700 may comprise various components that may be configured to support or enable various operations or functions pertinent to the use of the crawler system 700 (e.g., in assembling operation). In particular, the crawler system 700 may comprise a plurality of multifunction movement components (or legs), which may be attached to the crawler system 700 (or components thereof—e.g., movement arms, holder plates, etc.).

In addition, however, the crawler system 700 may be particularly configured to allow for orientation adjustment (e.g., to accommodate curved sections of traversed surfaces). For example, the crawler system 700 may comprise a multifunction end-effector 720, which may be substantially similar to the multifunction end-effector 120 of the crawler system 110 (i.e., being configurable to perform assembling related operation). The multifunction end-effector 720 may additionally comprise, however, a normality sensor 752, which may be utilized in determining the detail of the surface and/or orientation of the end-effector. This may allow adjusting the clamping of the multifunction end-effector 720 (e.g., via nozzle 750 and electromagnet 754) to ensure that apply any assembling operations (e.g., fastening) is adjusted for variation in the orientation of the system—i.e., applied vertically even where the system is tilted as result of the curvature of the surface.

In some instances, the movement legs may also incorporate additional elements for use in providing orientation adjustment. For example, the crawler system 700 may comprise primary legs 730, which may be substantially to the primary leg 200, as described with respect to FIG. 2, and may function in similar manner. In addition, however, the primary legs 730 may incorporate an orientation adjustment component, comprising, for example, a guide 740, which may be attached to an attachment plate 710 (which normally primary legs would be affixed to directly). Accordingly, the part of the primary leg 730 that correspond to the normal leg (e.g. primary leg 200) would be held within the guide 740. To provide the necessary orientation adjustment, wedge 744 may be driven, via a motor 742, into space within the guide, between the top inside surface of the guide 740 and the top of the remaining part of the primary leg 730 (as shown in FIG. 7). In this regard, the space may be of varying distance—i.e., the more the orientation adjustment (needed) the more the wedge 744 is driven.

Figure 8:
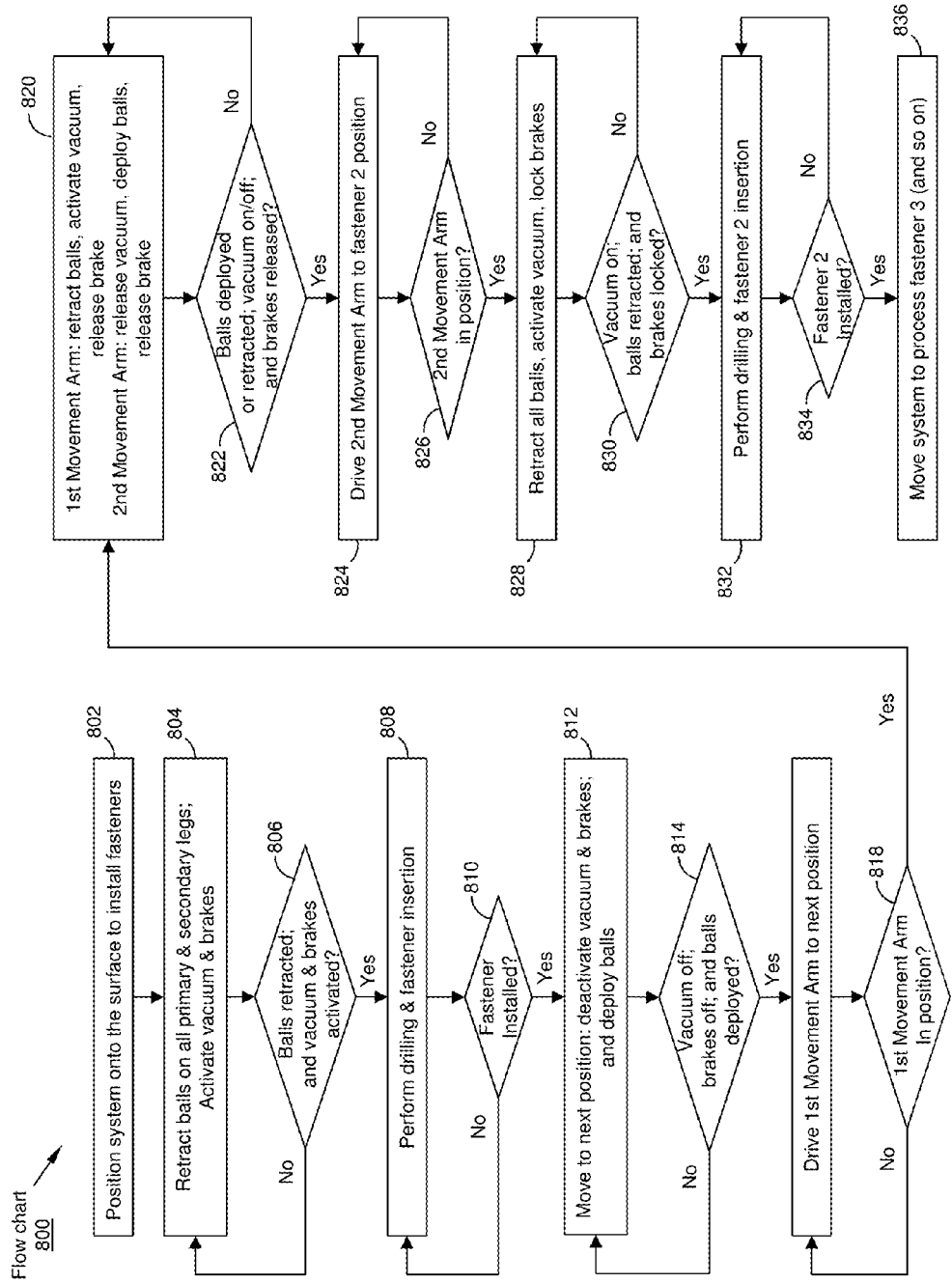
FIG. 8 is a flow chart that illustrates movement of an autonomous crawling assembly system that incorporates primary and secondary multifunction legs, during assembly of structure (e.g., aircraft component).

FIG. 8 is a flow chart that illustrates movement of an autonomous crawling assembly system that incorporates primary and secondary multifunction legs, during assembly of structure (e.g., aircraft component). Referring to FIG. 8, there is shown a flow chart 800, comprising a plurality of example steps, which may be performed by an automated motorized assembly device (e.g., the crawler system 510), during application of assembly related operations at plurality of positions (and movement between the positions).

In step 802, the crawler system may be placed onto a surface of a structure (e.g., the wing 100 of FIG. 1), to apply assembly related functions at plurality of positions—e.g., install a plurality of fasteners. In step 804, the crawler system may adhere to the surface. For example, with reference to the crawler system 510 of FIG. 5, the adhering may be achieved by retract rolling elements (balls) and activating vacuum on all primary leg(s) 560 and secondary leg(s) 570, to enable creation of seal between the legs and the surface; and also, for the secondary leg(s) 570, activating brakes, to disable floating thereby. In step 806, it may be determined whether all adhering related actions (e.g., as described with respect to step 804) have been executed, and in instances where all actions are executed, the process may proceed to step 808.

In step 808, the assembling related operations may be performed. For example, for fastener installation, the assembling related operations may comprise drilling and insertion of fasteners. The assembling related operations may be preconfigured (and/or preprogrammed), or alternatively may be determined dynamically (real-time) by the crawler system. In step 810, it may be determined whether all assembling related operations (e.g., as described with respect to step 808) have been executed (e.g., whether fastener is installed), and in instances where all actions are executed, the process may proceed to step 812.

In step 812, the crawler system may initiate movement to the next position (e.g., position of second fastener). In this regard, initiating the movement may comprise deactivating adhering function and/or activating moving (rolling) function of the leg(s) of one of the movement arms. This may comprise, for example, deploying rolling elements (balls) and activating vacuum on all primary leg(s) 560 and secondary leg(s) 570, to enable breaking of any seal between the legs and the surface and/or to allow movement (rolling) over the surface; and also, for the secondary leg(s) 570, deactivating brakes, to enable floating thereby. In step 814, it may be determined whether all movement initiation related actions (e.g., as described with respect to step 812) have been executed, and in instances where all actions are executed, the process may proceed to step 816. In step 816, one of the movement arms (e.g., the first movement arm 520) may be driven to the next position. This may comprise, for example, sliding the first movement arm 520 and the plate 540 (e.g., using the rail between the plate 540 and the second movement arm 530). In step 818, it may be determined whether movement of the movement arm (the first movement arm 520) is complete—i.e., it is in (next) position, and in instances where it is determined that the movement arm is in the next position, the process may proceed to step 820.

In step 820, one of the movement arms may be configured to apply (via its multifunction legs) adhering function while the other movement arm may be configured to further movement. For example, the adhering may be applied by the first movement arm 520 while the second movement arm 530 is configured to enable rolling over the surface. In this regard, adhering may be applied by the first movement arm 520 by, for example, retracting rolling elements (balls) and activating vacuum on all legs, to enable creation of seal between the legs and the surface; and also, for any secondary legs, activating brakes, to disable floating thereby. On the other hand, configuring the second movement arm 530 for rolling may comprise, for example, deploying rolling elements (balls) and deactivating vacuum in all legs, to enable moving (e.g., by rolling) over the surface and breaking of any seal between the legs and the surface; and also, for any secondary legs, deactivating the brakes, to enable floating thereby. In step 822, it may be determined whether all adhering related actions (e.g., as described with respect to step 804) have been executed, and in instances where all actions are executed, the process may proceed to step 824.

In step 824, the second movement arm 530 may be driven to the next position. This may comprise, for example, sliding the second movement arm 530 (e.g., using the rail between the plate 540 and the second movement arm 530). In step 826, it may be determined whether movement of the second movement arm 530 is complete—i.e., it is in (next) position, and in instances where it is determined that the movement arm is in the next position, the process may proceed to step 828.

In step 828, the second movement arm 530 may be configured to adhere to the surface. For example, the adhering may be achieved by retracting rolling elements (balls) and activating vacuum on all legs, to enable creation of seal between the legs and the surface; and also, for any secondary legs, activating brakes, to disable floating thereby. In step 830, it may be determined whether all adhering related actions (e.g., as described with respect to step 828) have been executed, and in instances where all actions are executed, the process may proceed to step 832.

In step 832, the assembling related operations may be performed at the next position (e.g., applying drilling/fastener insertion at position of second fastener). In step 834, it may be determined whether all assembling related operations (e.g., as described with respect to step 832) have been executed (e.g., whether the second fastener is installed), and in instances where all actions are executed, the process may proceed to step 836. In step 836, the crawler system may initiate movement to the next position (e.g., third fastener), and so forth.

Figure 9:
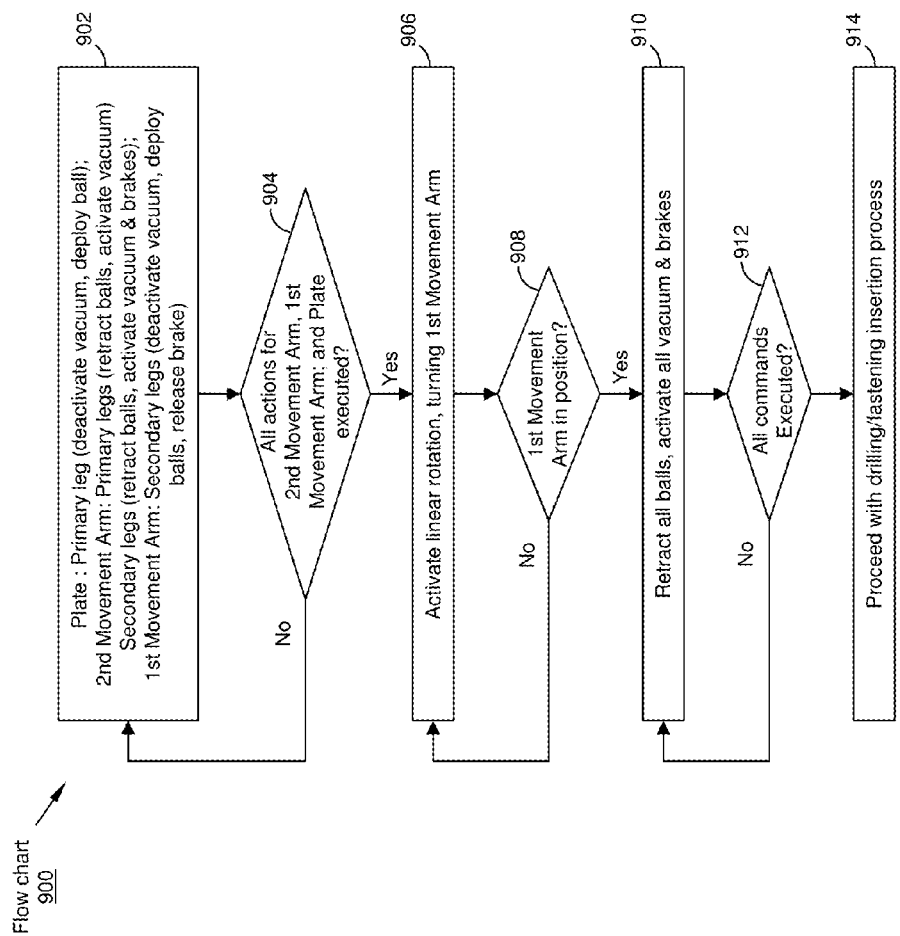
FIG. 9 is a flow chart that illustrates turning of an autonomous crawling assembly system that incorporates primary and secondary multifunction legs, during assembly of structure (e.g., aircraft component).

FIG. 9 is a flow chart that illustrates turning of an autonomous crawling assembly system that incorporates primary and secondary multifunction legs, during assembly of structure (e.g., aircraft component). Referring to FIG. 9, there is shown a flow chart 900, comprising a plurality of example steps, which may be performed by an automated motorized assembly device (e.g., the crawler system 510), to facilitate turning (rotating) of the device.

In step 902, particular actions may be performed by various movement components (e.g., primary and secondary movement components), to initiate the turning. For example, with reference to the crawler system 510 of FIG. 5, the actions may comprise, for the primary leg 560 of the plate 540 deactivating vacuum (to allow breaking any seal) and deploying rolling element (ball), to allow movement. For the first movement arm 520 (incorporating only secondary legs 570), vacuum may be deactivated (to allow breaking any seal), rolling element (ball) may be deployed (to allow movement), and brakes may be released (to allow floating). For the second movement arm 530 (incorporating both primary leg(s) 560 and secondary leg(s) 570), the actions may comprise, for the primary leg(s) 560, retracting rolling element (ball) and activating vacuum, to enable applying seal; whereas the actions for the secondary leg(s) 570 may comprise retracting rolling element (ball) and activating vacuum, to enable applying seal, and activating brakes, to disable floating. In other words, the actions performed may allow movement of the adhering of the second movement arm 530, and movement of the first movement arm 520 and the plate 560.

In step 904, it may be determined whether all actions (corresponding to step 902) where performed. In instances where it is determined that all actions all complete, the process may proceed to step 906. In step 906, rotation may be initiated. For example, a rotation actuator may be utilized to allow rotating of the first movement arm 520 (and the plate 540). In step 908, it may be determined whether (or not) the moving arm (e.g., the first movement arm 520) has rotated into position. In instances where it is determined that the moving arm has rotated into position, the process may proceed to step 910. In step 910, the moving arm may be configured to adhere to the surface of the assembled structure. For example, once the first movement arm 520 has rotated into position, the rolling element (ball) of its secondary legs 570 may be retracted and vacuum may be activated, to enable applying seal, with the brakes also being activated, to disable floating. In step 912, it may be determined whether all the necessary (adhering related) actions have been executed; and in instances where all the actions are executed, the process may proceed to step 914, where assembly related operations (e.g., drilling, fastening/fastener insertion, etc.) may be performed.

Other embodiments may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multifunction legs for autonomous crawling assembly equipment.

Accordingly, the presently disclosed embodiments may be realized in hardware, software, or a combination of hardware and software. The present embodiments may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The presently disclosed embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While described with reference to certain embodiments, it will be understood by those skilled in the art that various changes may be made and equivalents may be substituted without departing from the scope of the presently described embodiments. In addition, many modifications may be made to adapt a particular situation or material to the teachings without departing from its scope. Therefore, it is intended that the presently disclosed embodiments not be limited to the particular embodiment disclosed, but rather will include all embodiments falling within the scope of the appended claims.

What is claimed is:

1. An apparatus, comprising:
    an automated motorized device operable to move on a structure for use in assembling of the structure, the automated motorized device comprising:
        an end effector configured to perform a plurality of assembling related functions; and
        a plurality of multifunction movement components that are attached to a first movement assembly and a second movement assembly, wherein the first movement assembly and the second movement assembly are each configured to adhere to the structure with a corresponding group of the plurality of multifunction movement components while the other of the first movement assembly and the second movement assembly moves relative to the structure and translates alongside and parallel relative to the adhered one of the first movement assembly and the second movement assembly;
    wherein:
        each multifunction movement component performs at least an adhering function and a moving function;
        each multifunction movement component comprises a sealing element for use in performing the adhering function, the sealing element being configurable to create a seal around a chamber, defined by the sealing element, when the sealing element is in contact with a surface, by application of pneumatic suction into the chamber, thus urging a corresponding multifunction movement component onto the surface; and
        each multifunction movement component comprises a rolling element for use in performing the moving function, the rolling element disposed within the chamber defined by the sealing element and being configurable to move on a surface when in contact with the surface, the rolling element becoming in contact with the surface by deploying the rolling element such that any seal by the sealing element is prevented or broken.

2. The apparatus of claim 1, wherein three of the plurality of multifunction movement components are configured to form a triangle for maintaining contact with the structure, including when traversing compound surfaces.

3. The apparatus of claim 1, wherein the rolling element is operatively attached to a piston that is configured to dispose within a secondary chamber; and
    the piston is controlled to retract to establish a seal around the chamber and to extend to deploy the rolling element to separate the seal from the surface.

4. The apparatus of claim 3, wherein the piston is controlled pneumatically.

5. The apparatus of claim 1, wherein at least one of the plurality of multifunction movement components comprises a biasing element, the biasing element being configured to allow adjusting positioning of the corresponding multifunction movement component in one or both of vertical and horizontal directions.

6. The apparatus of claim 5, wherein the biasing element operates pneumatically or based on spring-loading.

7. The apparatus of claim 1, wherein at least one of the plurality of multifunction movement components comprises an orientation element, the orientation element being configured to allow adjustment of one or both of orientation and normality, of one or both of a corresponding movement component and at least a component of the automated motorized device connected to the corresponding movement component.

8. The apparatus of claim 1, wherein the first movement assembly and the second movement assembly are configured to adjust a course of movement of the automated motorized device during operation of the automated motorized device.

9. The apparatus of claim 1, wherein the automated motorized device comprises a pivoting component that is connected concentrically to the end effector and connected to at least one of the first movement assembly and the second movement assembly, the pivoting component being operable to:
    rotate the end effector and the at least one of the first movement assembly and the second movement assembly, during adjusting of course of movement of the automated motorized device, while the other one of the first movement assembly and the second movement assembly secures the automated motorized device to the structure.

10. The apparatus of claim 9, wherein adjusting the course of movement of the automated motorized device comprises rotating via the pivoting component the other one of the first movement assembly and the second movement assembly onto an adjusted course of movement while at least one of the first movement assembly and the second movement assembly secures the automated motorized device to the structure.

11. The apparatus of claim 1, wherein the rolling element is at least partially positioned within the chamber and deploys through the chamber.

12. An apparatus, comprising:
a plurality of movement components for use in automated motorized assembly systems, the plurality of movement components arranged on a first movement assembly and a second movement assembly, each of the first movement assembly and the second movement assembly to adhere to a surface with a corresponding group of the plurality of multifunction movement components while the other of the first movement assembly and the second movement assembly moves relative to the surface wherein one of the first movement assembly and the second movement assembly is configured to translate alongside and parallel relative to the other of the first movement assembly and the second movement assembly in a linear position adjustment and one of the first movement assembly and the second movement assembly is configured to pivot relative to the other of the first movement assembly and the second movement assembly about an axis perpendicular to the surface in a rotational position adjustment, each movement component comprising:
a sealing element configurable to create a seal around a chamber, defined by the sealing element, when the sealing element is in contact with the surface, by application of pneumatic suction into the chamber, thus urging a corresponding movement component onto the surface;
a rolling element comprising a ball configured to move on a surface when the rolling element is in contact with the surface, the rolling element becoming in contact with the surface by deploying the rolling element such that any seal by the sealing element is prevented or broken; and
a piston that is configured to dispose within a secondary chamber, wherein:
the piston is operatively attached to the rolling element, and
the piston is controlled to retract to establish a seal around the chamber and to extend to deploy the rolling element to separate the seal from the surface.

13. The apparatus of claim 12, wherein the movement component comprises a biasing element operable to allow adjusting positioning of the movement component in one or both of vertical and horizontal directions.

14. The apparatus of claim 13, wherein the biasing element is operated pneumatically or based on spring-loading.

15. The apparatus of claim 12, wherein the movement component comprises an orientation element operable to allow adjustment of one or both of orientation and normality, of one or both of the movement component and a component connected to the movement component.

16. The apparatus of claim 15, wherein the orientation element comprises a motorized wedging element.

17. The apparatus of claim 12, wherein the movement component comprises a braking element operable to maintain a position of the movement component, or at least one element of the movement component.

18. The apparatus of claim 12, wherein the movement component comprises a venting element operable to release a seal created by the sealing element, to allow moving the sealing element away from the surface.

19. A method, comprising:
positioning an end effector of an automated motorized device that is operable to move on a structure for use in assembling of the structure, at each of a plurality of predetermined locations of the structure, wherein the end effector is configured to apply one or more of a plurality of assembling related functions at each of the plurality of predetermined locations; and
moving the automated motorized device to each of the plurality of predetermined locations by use of a plurality of primary multifunction movement components and a plurality of secondary multifunction movement components, wherein:
the plurality of primary multifunction movement components and the plurality of secondary multifunction movement components are attached to a first movement assembly and a second movement assembly of the automated motorized device; and
moving the automated motorized device comprises securing one of the first movement assembly and the second movement assembly to the structure while the other one of the first movement assembly and the second movement assembly moves over the structure; and
wherein, for each movement component, corresponding to one of the plurality of primary multifunction movement component or one of the plurality of secondary multifunction movement component:
functions of the movement component comprise at least adhering and rolling;
the adhering is performed using a sealing element that is configurable to create a seal around a chamber, defined by the sealing element, when the sealing element is contact with a surface, by application of pneumatic suction into the chamber, thus urging the movement component onto the surface; and
the rolling is performed using a rolling element that is disposed with the chamber defined by the sealing element and configurable to move on a surface when the rolling element is in contact with the surface, the rolling element becoming in contact with the surface by deploying the rolling element such that any seal by the sealing element is prevented or broken.

20. The method of claim 19, wherein the structure is an aircraft component.

21. The method of claim 20, wherein the aircraft component comprises a fuselage, a wing, or a section thereof.

22. The method of claim 20, wherein adjusting the course of movement of the automated motorized device comprises rotating via a pivoting component, the end effector and the at least one of the first movement assembly and the second movement assembly while the other one of the first movement assembly and the second movement assembly secures the automated motorized device to the structure.

23. The method of claim 22, wherein adjusting the course of movement of the automated motorized device comprises rotating via the pivoting component, the other one of the first movement assembly and the second movement assembly onto the adjusted course of movement, while the at least one of the first movement assembly and the second movement assembly secures the automated motorized device to the structure.

24. The method of claim 19, comprising forming using three of the plurality of primary multifunction movement components a triangle that is configurable to maintain contact with the structure, including when traversing compound surfaces.

25. The method of claim 19, comprising deploying the rolling element using a piston that is operatively attached to the rolling element, the piston being configured to dispose within a secondary chamber; and
  the piston is controlled to retract when a seal around the chamber is desired, and to extend to deploy the rolling element when the seal is not desired or movement is desired.

26. The method of claim 19, comprising adjusting a course of movement of the automated motorized device, during operation of the automated motorized device, using the first movement assembly and the second movement assembly.

* * * * *